United States Patent
Rao

(10) Patent No.: US 12,488,156 B2
(45) Date of Patent: Dec. 2, 2025

(54) INTEGRATING CALIBRATED MODELS WITH COMPUTATIONAL PHYSICS SIMULATIONS

(71) Applicant: Dassault Systemes Americas Corp., Waltham, MA (US)

(72) Inventor: Kaustubh Rao, South Kingston, RI (US)

(73) Assignee: Dassault Systemes Americas Corp., Waltham, MA (US)

( * ) Notice: Subject to any disclaimer, the term of this patent is extended or adjusted under 35 U.S.C. 154(b) by 821 days.

(21) Appl. No.: 17/210,723

(22) Filed: Mar. 24, 2021

(65) Prior Publication Data
US 2022/0309199 A1  Sep. 29, 2022

(51) Int. Cl.
*G06F 30/20* (2020.01)
*G06F 30/12* (2020.01)
(Continued)

(52) U.S. Cl.
CPC ............ *G06F 30/12* (2020.01); *G06F 30/20* (2020.01); *G06F 2111/20* (2020.01)

(58) Field of Classification Search
CPC ...... G06F 30/12; G06F 30/20; G06F 2111/20; G06F 2111/10; G06F 30/23; G06F 30/28;
(Continued)

(56) References Cited

U.S. PATENT DOCUMENTS

| 8,335,671 B2 * | 12/2012 | Engl | G16B 15/00 |
| | | | 703/2 |
| 10,303,825 B2 | 5/2019 | Rao et al. | |

(Continued)

FOREIGN PATENT DOCUMENTS

| CN | 101611357 B | * | 4/2013 | ............. G05B 17/02 |
| WO | WO-2019180466 A1 | * | 9/2019 | ........... B29C 64/386 |
| WO | 2019/222129 | | 11/2019 | |

OTHER PUBLICATIONS

European Search Report for EP22164027.9, dated Sep. 7, 2022.
(Continued)

*Primary Examiner* — Rehana Perveen
*Assistant Examiner* — John David Hagler
(74) *Attorney, Agent, or Firm* — Sheehan Phinney Bass & Green PA

(57) ABSTRACT

A computer-implemented method of integrating a calibrated model with physics computations in a computer-based simulation of a planned or existing real-world environment is disclosed. The method includes representing a selected component with a calibrated model thereof, wherein the calibrated model of the selected component defines an interface boundary and a modeled region, which is inside the interface boundary and distinct from a physics region, which is outside the interface boundary. The method includes producing modeled solution variable values based on the calibrated model at computational points along the interface boundary of the calibrated model. The method includes producing computed solution variable values based on physics computations at computational points in the physics region. The method includes exchanging the modeled variable values with the computed variable values across the interface boundary.

17 Claims, 24 Drawing Sheets

(51) Int. Cl.
*G06F 30/23* (2020.01)
*G06F 30/28* (2020.01)
*G06F 111/20* (2020.01)

(58) Field of Classification Search
CPC ............. G06F 2113/08; G06F 2119/08; G06F 2119/14
See application file for complete search history.

(56) References Cited

U.S. PATENT DOCUMENTS

2017/0364043 A1* 12/2017 Ganti ................... G05B 17/02
2018/0357343 A1* 12/2018 Klenner ................. G06N 3/08
2021/0357541 A1   11/2021 Rao et al.

OTHER PUBLICATIONS

Barszcz, et al: "Presentation of a Virtual Power Plant Environment and its application with combined first principle and data driven models intended for the diagnostics of a power plant- Part I", Simulation XX XX, vol. 8 No 2, Feb. 1, 2012.
Rao, et al "In-situ formulation of calibrated models in multi component physics simulation"; U.S. Appl. No. 17/210,804, filed Mar. 24, 2021.

* cited by examiner

| Re | 2.5·10 | 4·10 | 6·10 | 10² | 2·10² | 4·10² | 10³ | 2·10³ | 4·10³ | 10⁴ | 2·10⁴ | 10⁵ | 2·10⁵ | >10⁵ |
|---|---|---|---|---|---|---|---|---|---|---|---|---|---|---|
| $\dfrac{Re}{\varepsilon_0}$ | 0.34 | 0.36 | 0.37 | 0.40 | 0.42 | 0.46 | 0.53 | 0.59 | 0.64 | 0.74 | 0.81 | 0.94 | 0.96 | 0.98 |
| $\dfrac{F_0}{F_1}$ | | | | | | VALUES OF $\zeta_\phi$ | | | | | | | | |
| 0 | 1.94 | 1.38 | 1.14 | 0.89 | 0.69 | 0.64 | 0.39 | 0.30 | 0.22 | 0.15 | 0.11 | 0.04 | 0.01 | 0 |
| 0.2 | 1.78 | 1.36 | 1.05 | 0.85 | 0.67 | 0.57 | 0.36 | 0.26 | 0.20 | 0.13 | 0.09 | 0.03 | 0.01 | 0 |
| 0.3 | 1.57 | 1.16 | 0.88 | 0.75 | 0.57 | 0.43 | 0.30 | 0.22 | 0.17 | 0.10 | 0.07 | 0.02 | 0.01 | 0 |
| 0.4 | 1.35 | 0.99 | 0.79 | 0.57 | 0.40 | 0.28 | 0.19 | 0.14 | 0.10 | 0.06 | 0.04 | 0.02 | 0.01 | 0 |
| 0.5 | 1.10 | 0.75 | 0.55 | 0.34 | 0.19 | 0.12 | 0.07 | 0.05 | 0.03 | 0.02 | 0.1 | 0.01 | 0.01 | 0 |
| 0.6 | 0.85 | 0.56 | 0.30 | 0.19 | 0.10 | 0.06 | 0.03 | 0.02 | 0.01 | 0.01 | 0 | 0 | 0 | 0 |
| 0.7 | 0.58 | 0.37 | 0.23 | 0.11 | 0.06 | 0.03 | 0.02 | 0.01 | 0 | 0 | 0 | 0 | 0 | 0 |
| 0.8 | 0.40 | 0.24 | 0.13 | 0.06 | 0.03 | 0.02 | 0.01 | 0 | 0 | 0 | 0 | 0 | 0 | 0 |
| 0.9 | 0.20 | 0.13 | 0.08 | 0.03 | 0.01 | 0 | 0 | 0 | 0 | 0 | 0 | 0 | 0 | 0 |
| 0.95 | 0.03 | 0.03 | 0.02 | 0 | 0 | 0 | 0 | 0 | 0 | 0 | 0 | 0 | 0 | 0 |

$d_h = \dfrac{4f_0}{\Pi_0}$ ; $\Pi_0$ -PERIMETERS; $\bar{f} = \dfrac{F_0}{F_1}$ ;

$\vartheta$ = IS TAKEN FROM § 1-3, B

| $\bar{f}$ | 0 | 0.1 | 0.2 | 0.3 | 0.4 | 0.5 | 0.6 | 0.7 | 0.8 | 0.9 | 1.0 |
|---|---|---|---|---|---|---|---|---|---|---|---|
| $\zeta_0$ | 1.71 | 1.67 | 1.63 | 1.59 | 1.55 | 1.50 | 1.45 | 1.39 | 1.32 | 1.22 | 1.0 |

INTEGRATING CALIBRATED MODELS WITH COMPUTATIONAL PHYSICS SIMULATIONS

FIELD OF THE INVENTION

This disclosure relates to calibrated models and, more particularly, integrating calibrated models with computational physics in simulations.

BACKGROUND

A simulation environment may include multiple components whose individual effects along with the interaction with other components are all accounted for, for example, using physics computation methodology to simulate the complex multi-component physics behaviors. For example, consider a simulation modeling the thermal behavior of a certain system using physics computation models to account for the thermal behavior of each of the individual system components and their effect on the entire system as a whole. Since each component may interact with one or more of the other components in complex ways, the simulation of the system may be very resource intensive and time consuming. Therefore, there is a need in the industry for a method for efficiently modeling a component for system simulation.

SUMMARY OF THE INVENTION

In one aspect, a computer-implemented method is disclosed of integrating a calibrated model with physics computations in a computer-based simulation of a planned or existing real-world environment. The method includes representing a selected component with a calibrated model thereof, wherein the calibrated model of the selected component defines an interface boundary and a modeled region, which is inside the interface boundary and distinct from a physics region, which is outside the interface boundary. The method includes producing modeled solution variable values based on the calibrated model at computational points along the interface boundary of the calibrated model. The method includes producing computed solution variable values based on physics computations at computational points in the physics region. The method includes exchanging the modeled variable values with the computed variable values across the interface boundary.

In another aspect, a computer-based system is disclosed for integrating a calibrated model with physics computations in a computer-based simulation of a planned or existing real-world environment. The computer-based system includes one or more computer processing devices; and computer-based memory operatively coupled to the one or more processing devices. The computer-based memory stores computer-readable instructions that, when executed by the one or more processors, cause the computer-based system to: represent a selected component with a calibrated model thereof, wherein the calibrated model of the selected component defines an interface boundary and a modeled region, which is inside the interface boundary and distinct from a physics region, which is outside the interface boundary, produce modeled solution variable values based on the calibrated model at computational points along the interface boundary of the calibrated model, produce computed solution variable values based on physics computations at computational points in the physics region, and exchange the modeled variable values with the computed variable values across the interface boundary.

In yet another aspect, a non-transitory computer readable medium is disclosed that has stored thereon computer-readable instructions that, when executed by a computer-based processor(s), causes the computer-based processor(s) to represent a selected component with a calibrated model thereof, wherein the calibrated model of the selected component defines an interface boundary and a modeled region, which is inside the interface boundary and distinct from a physics region, which is outside the interface boundary. The computer-based processor(s) further produce modeled solution variable values based on the calibrated model at computational points along the interface boundary of the calibrated model, produce computed solution variable values based on physics computations at computational points in the physics region, and exchange the modeled variable values with the computed variable values across the interface boundary.

In some implementations, one or more of the following advantages are present.

For example, various implementations provide for relatively easy simulation/workflow setup, since the modeled components do not need a detailed physical description (as the system does not perform rigorous physics-based computations in the calibrated model-portion of a simulated environment. For example, it does not generally include detailed geometric, material properties, and other such descriptions that would be required if a physics computation were being performed. This, typically results in saving computer resources as the system does not have to mesh, compute, nor render modeled components in full detail. In typical implementations, the systems and techniques disclosed herein provide for increased accuracy in solution as physics computation are carried out in regions of the simulation that are not modeled because not modeling makes sense in those regions. Workflow is generally scalable to integrate newer and richer calibration models over time. Even particular calibration models are able to evolve and adapt to changes in component configuration, setup, operation parameters, and even changing solutions as the solutions are being computed. Typical implementations eliminate the limitation of being able to use only components that conform to a handbook's design specification and/or operation limitations. Component models obtained from handbooks and FMU approach are limited in their operational scope. Simulation reliant on those approaches are limited to only the operating conditions in which these models were developed. The systems and techniques disclosed herein generally facilitate a wider range of applicability, higher fidelity results (e.g., more rich physics), etc.

Moreover, in various implementations, the systems and techniques disclosed herein: 1) provide a methodology that can successfully couple computational physics with functional modeling to produce a solution not lacking in its fidelity and accuracy, 2) provide a methodology flexible enough to account for the wide variations in a functional component that needs modeling (or gets modeled) as well as accommodate a wide range of operating conditions in which the functional component can be used, 3) allow for a methodology to adapt and improve on the component's model without having to run any physical experiments, and/or 4) allow for a way to change the functional model's response behavior based on the solution variable values.

Other features and advantages will be apparent from the description and drawings, and from the claims.

BRIEF DESCRIPTION OF THE DRAWINGS

Like reference characters refer to like elements.

DETAILED DESCRIPTION

Figure 1A:
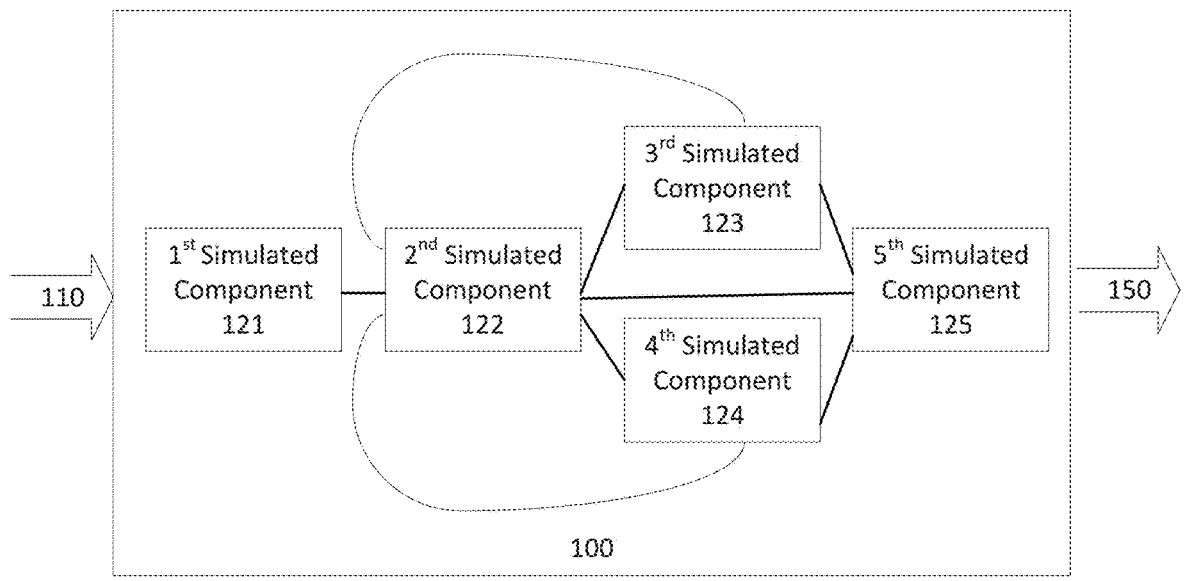
FIG. 1A is a schematic diagram depicting a simulation of a system using a plurality of simulated system components.

This document uses a variety of terminology to describe its inventive concepts. Unless otherwise indicated, the following terminology should be understood as having meanings that are consistent with what follows.

For example, unless otherwise indicated, the phrase "real-world environment" refers to any non-virtual (e.g., physical) environment that can be modeled/simulated as a virtual (e.g., computer-generated) environment. Some examples of real-world environments include electrical, electronic, mechanical, or electromechanical products. Other examples of real-world environments include computer hardware components, such as laptops, desktops, mobile phones, etc.

Unless otherwise indicated, a "real-world component" refers to a non-virtual (e.g., physical) part or component within a real-world environment. A real-world component can be modeled as a virtual component on its own of within a virtual environment. A few examples of real-world components include blower fans, cooling coils, heat sinks, and perforated plates.

Unless otherwise indicated, "simulation" refers the virtual representation of real-world environments and/or real-world components using one or more computer-generated models.

Unless otherwise indicated, the phrase "virtual environment" refers to a computer-generated simulation of a real-world environment. In a typical implementation, a virtual environment is able to simulate behavior(s) of the real-world environment.

Unless otherwise indicated, the phrase "virtual component" refers to a computer-generated simulation of a real-world component. In a typical implementation, a virtual component is able to simulate behavior(s) of a real-world component.

Unless otherwise indicated, the phrase "model" refers to any virtual representation of a real-world environment or real-world component.

Unless otherwise indicated, the phrase "calibrated model" refers to a virtual object that represents one or more behavior (s) of a corresponding real-world component. A calibrated model typically that has a multi-dimensional interface boundary (with a response surface) that interacts with the virtual environment surrounding the calibrated model by receiving inputs and producing outputs across its surface. In a typical implementation, the outputs are produced from the inputs without having to perform rigorous iterative mathematical computations at the time of the virtual environment simulation. In some implementations, the outputs of a calibrated model may be produced by referencing a table and interpolating as needed, and/or by referencing a set of equations (e.g., polynomial equations) or one or more subroutines that represent behavior(s) of the corresponding real-world component. Moreover, typically, a calibrated model is able to produce outputs across a wide variety of combinations of inputs.

Exemplary processes for producing a calibrated model are disclosed herein (below) and in the applicant's co-pending patent application entitled In-situ Formulation of Calibrated Models in Multi Component Physics Simulation (U.S. patent application Ser. No. 17/210,804), which is incorporated by reference in its entirety herein.

Unless otherwise indicated, the phrase "interface" or "interface boundary" refers to a virtual outer boundary of a calibrated model of a real-world component in a virtual environment. The interface boundary is typically contoured to define a surface that follows or approximates the physical contours of a corresponding real-world component associated with the calibrated model. An interface boundary interfaces interacts with the virtual environment surrounding a calibrated model to receive inputs and produce outputs.

Unless otherwise indicated, the phrase "rigorous, mathematical computation" or "physics-based computation" may refer to computer-based simulation techniques that is numerically and mathematically rigorous and computationally expensive and may, in some instances, include iteratively solving to convergence a set of derived mathematical expressions that model the behavior of a real-world environment or portion thereof. These sorts of techniques tend to be highly resource intensive.

Unless otherwise indicated, a "physics computation model" of a system component is a computer-based simulation that is based on derived mathematical expressions modeling the behavior of the system component based on the underlying physical properties of the component. The physical computation model receives parameters that define the structural characteristics (dimensions, materials, etc.) of the component, and when executed, produces outputs using calculations according to how the model responds when subject to various operating and/or environmental conditions.

Unless otherwise indicated, a "virtual experiment" generally refers to the execution of a test setup using a physics computation model of a system component. During a virtual experiment, tests may be run and re-run using different input values to record the corresponding output response of specified outputs. Each run of the test corresponding to a different input is referred to herein as a "pass."

Unless otherwise indicated, a "response surface" refers to an n-dimensional continuous surface that provides a continuous output value for a continuous variation in n-dimensional inputs that have a bounded range. A response surface typically is constructed from a range of discrete n-dimensional input parameters and the corresponding output parameter.

Unless otherwise indicated, a "functional mock-up unit (FMU)" refers to an approach used for systems level simulation. Each functional block in a system tries to represent the operation of a component of a system in isolation. This simplified functional representation takes in certain inputs that are evaluated to provide outputs. The output from a FMU is fed to another FMU as an input or is one of the desired output of the system. Note between functional blocks there is no physics computation, and the functional modeling of each system component is modeled in isolation, the FMU approach cannot effectively capture the complex non-linear effects of system components interacting with one another. In summary an FMU simulation primarily consists of simplified models interacting with other models.

Unless otherwise indicated, a "reduced order model" (ROM) is a simplified representation of a complex system. This simplified model may be used in FMUs to aid with systems level simulations.

Unless otherwise indicated, "design of Experiments (DOE)" refers to a technique where controlled experiments (simulation or real) are carried out for valid combinations of input parameters within a specified range. The outcome of each experiment variant is observed to finally aid in analyzing the effect of each parameter on the system.

Companies today generally understand the need to simulate real-world physical environments and components thereof in virtual environments in order to better understand system and component performance, manage cost, increase performance, and power sustainable innovation. A variety of computer-based simulation platforms exist including, for example, the Simulia® brand of products (including simulation system), available from Dassault Systemes Simulia Corp, the applicant of this patent filing. In a typical implementation, the systems and techniques disclosed herein can be incorporated into such simulation platforms to provide a balance of simulation accuracy and rigor along with efficiency and speed, in a user-friendly manner.

More specifically, in a typical implementation, the systems and techniques disclosed herein provide for integrating one or more functional, calibrated models into a virtual environment that may otherwise be simulated using an approach that includes rigorous mathematical computations. These functional models, unlike in the hand-book, table or FMU approaches (discussed herein), are dynamic and can respond live to the solution that is being computed. Furthermore, the calibrated models are generally capable of evolving over time and are adaptive to variations in operational conditions and component specifications (e.g., round holes vs square holes). The solution may in turn change the response characteristics of the modeled component. This is also accounted for. Examples of such would be; perforated plate holes expand or contract due to change in computed temperature (temperature being one of the solution). This would result in a new response behavior of the plates. This response change would be continuous as opposed to incremental. Another example would be the heat dissipation characteristics being modeled for a heat pipe will change as the heat pipe may expand due to warmer ambient temperature.

Figure 1B:
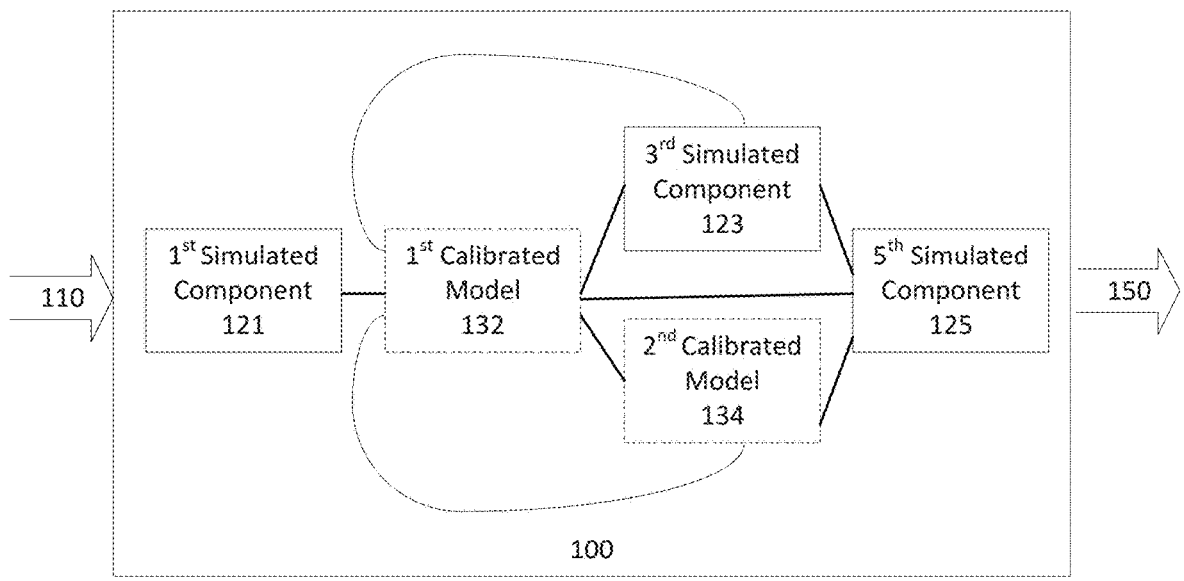
FIG. 1B is a schematic diagram depicting the simulation of the system of FIG. 1A replacing two simulated system components with corresponding calibrated models.

These systems and techniques can be understood, at a high level, by referring to the schematic representations of a virtual environment in FIGS. 1A and 1B.

In general, as shown in FIG. 1A, for example, simulation software may be configured to produce a simulation of a real-world physical system that includes multiple system components being included in the simulation with their detailed physical description. All the components 121-125 are simulated together as a system using physics computation methodology. For example, the simulation may involve modeling the thermal behavior of the system 100 by using physics computation models simulating the thermal behavior of each of five system components 121-125. Here, the simulation receives an input 110 and produces an output 150. Since each component 121-125 may interact with one or more of the other components in complex ways, the simulation of the system 100 may be extremely resource intensive and time consuming.

As shown in FIG. 1B, instead of executing physics computation model 121-125 for each component, the physics computation model for one or more component is replaced with a calibrated model. For example, the second physics computation model 122 is replaced by a first calibrated model 132, and the fourth physics computation model 124 is replaced by a second calibrated model 134. The calibrated models 132, 134 of FIG. 1B operate as black-box replacements for the respective in-line physics computation models 122, 124 of FIG. 1A, accepting the same inputs and providing the same outputs upon execution of the system simulation. Each calibrated model 132, 134 is less resource intensive than the corresponding physics computation model 122, 124, for example by at least an order of magnitude.

Therefore, there is a need in the industry for a method for efficiently producing a calibrated model for a given component.

There is generally a lot to gain by modeling solutions for certain components in a simulation rather than computing solutions for every component using a rigorous, mathematical physics-based computational approach.

Prior Techniques

Some prior simulation techniques, discussed below in turn, include the use of functional mock-up units, and the use of handbook and basic lookup table information. The techniques disclosed in present application differ from those prior techniques. For example, the techniques disclosed in the present application involve utilizing rigorous mathematical computations together and integrating calibrated models to simulate a real-world environment having one or more real-world components. None of the prior optimization techniques discussed below involves utilizing rigorous mathematical computations together and integrating calibrated models to simulate a real-world environment having one or more real-world components, as disclosed in the present application.

Functional Mock-up Units (FMU) Approach

A functional mock-up unit (FMU) is a model that represents the functionality of a component in a simulated environment. In a typical implementation, FMUs may be coupled together with the output of one FMU feeding into the input of another. In this manner, FMUs can be used to model and understand interactions between several components.

Figure 2:
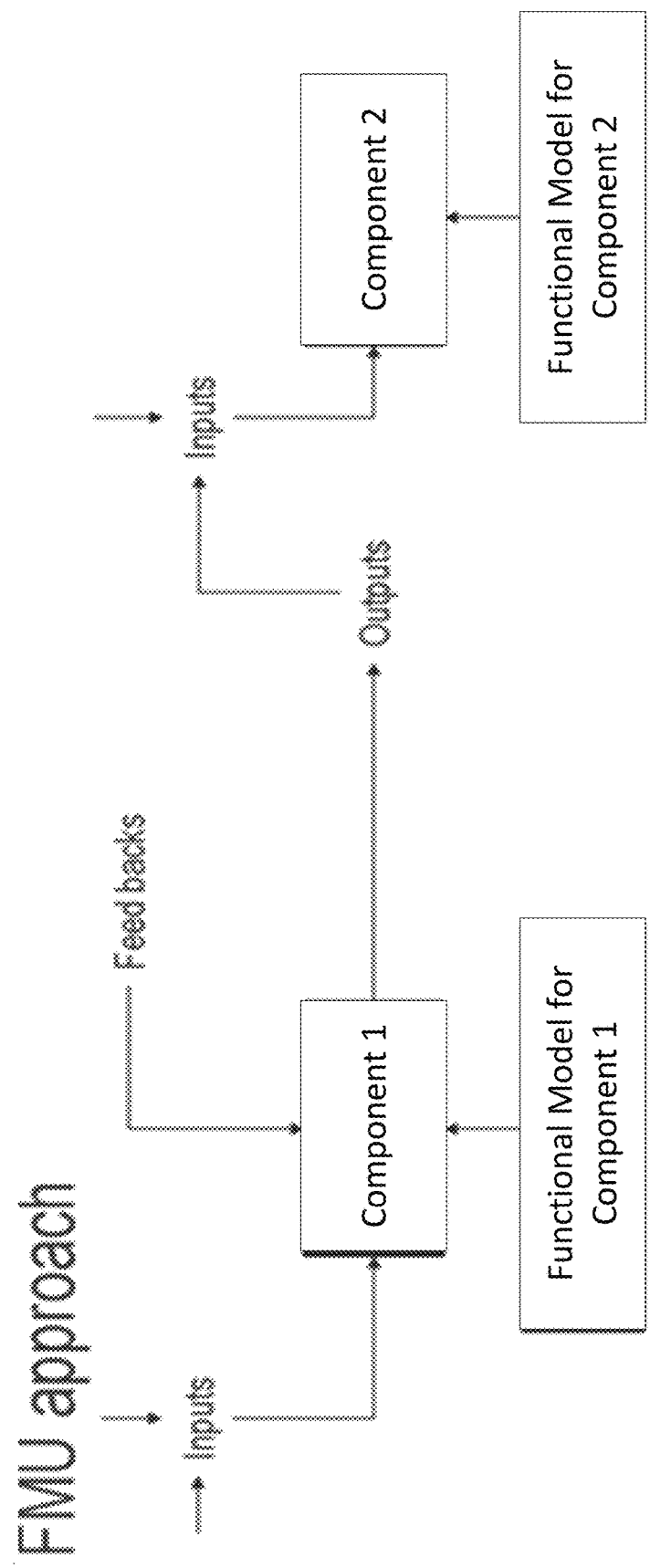
FIG. 2 is a schematic representation of a prior art functional mockup unit (FMU) approach to systems level simulation.

FIG. 2 is a schematic representation of a simulation environment that includes two FMUs, each of which is a model representing functionality of a corresponding component (component 1 or component 2, respectively). Component 1, in the illustrated simulation, receives as input data several inputs and feedback (e.g., from its environment) and produces an output. Component 2, in the illustrated simulation, receives the output of component 1 as one of its inputs.

The systems and techniques disclosed herein are different than the FMU approach. For example, in the FMU approach, the entire simulation typically consists entirely of modeled components, whereas implementations of simulations according to the systems and techniques disclosed herein generally involve integrating calibrated models with more rigorous iterative, physics-based, computations. In the FMU approach, there is generally no coupling of rigorous iterative physics-based computations into the simulation. Moreover, in the FMU approach, the output of a particular FMU is generally fed as an input into the next FMU if there is one. The systems and techniques disclosed herein include integrating a calibrated model that interacts with its surrounding environments across the entire surface, or at least a substantial portion, of its interface boundary.

Moreover, although some FMU models may account for minor variations in components, and they need to be determined prior to the simulation setup. There is no easy way to evolve or adapt the models for the use of non-standard components, which are frequently used in the real-world. Implementations of the systems and techniques disclosed herein, however, can be easily adopted to account for the use of non-standard components.

Dymola Simulation Software

Dymola® simulation software, available from Dassault Systemes Simulia Corp, the applicant of this patent filing, provides a simulation environment that is similar to the functional mock-up units (FMUs) approach discussed above. More specifically, Dymola® simulation software provides a graphical programming environment for modeling, simulating and analyzing multi-domain dynamical systems. Moreover, its primary interface includes a graphical block diagramming tool and a customizable set of block libraries.

Figures 3, 3A:
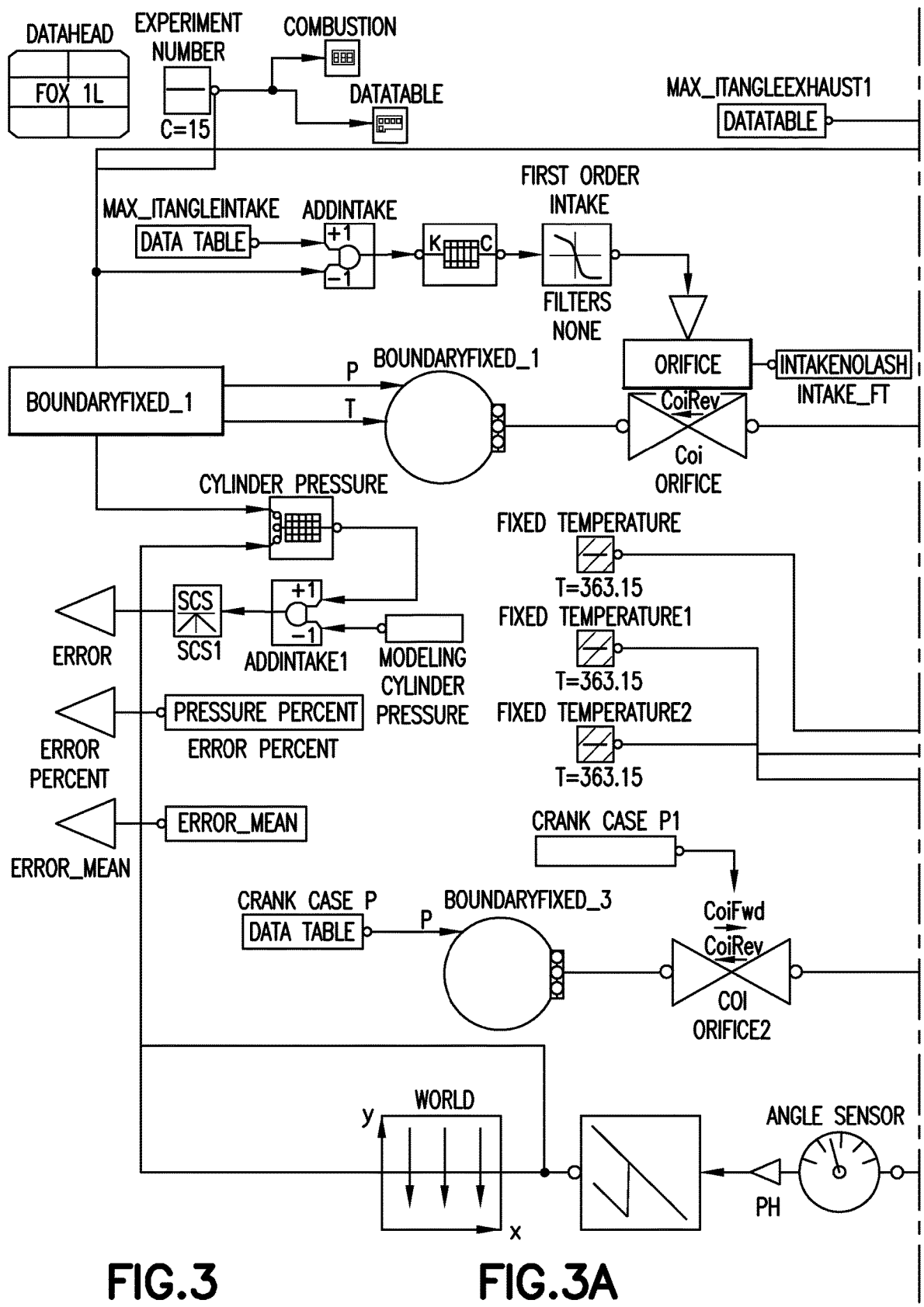
FIG. 3 is a schematic representation of an internal combustion engine system simulation based on prior art Dymola® simulation software.
Figure 3B:
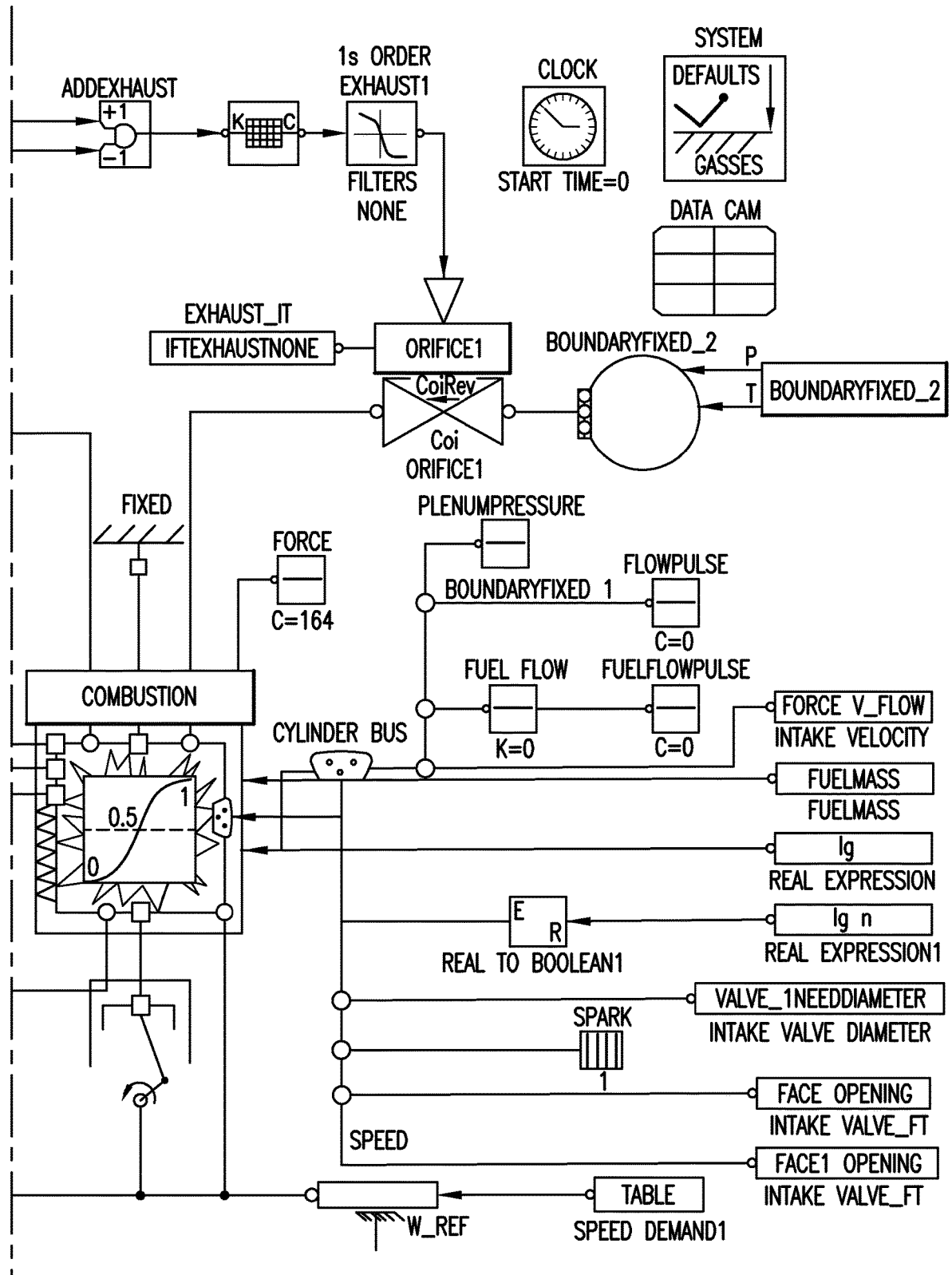

FIG. 3 is a schematic representation of a systems level simulation created in a Dymola® simulation software environment. The illustrated simulation is of an internal combustion engine and includes a number of different symbols, each representing a model of a corresponding engine component, and the symbols are connected to one another as shown to reflect how the corresponding components would be connected in a real-world version of the simulated engine.

The systems and techniques disclosed herein differ from the functionalities provided by Dymola® simulation software. For example, in Dymola® simulation software, as in the FMU approach, the approach primarily consists of modeling the component's response to the solution only. Responses are relayed directly to one or more different components and new responses are generated from earlier modeled responses. It is clear that there is very little, if any, physics-based computations (e.g., solving of governing partial differential equations, PDEs) is taking place in Dymola® simulation software functionalities represented in the figure. Certainly, the Dymola® simulation software functionalities represented in the figure do not integrate calibration models with rigorous iterative physics-based computations in the same way that the systems and techniques disclosed herein do.

Moreover, since there is little to no physics-based computations occurring in the Dymola® simulation software functionalities represented in figure, the utility of that application is limited by the operating ranges of its component models. In order for a model to simplify a simulation process, it necessarily has several assumptions baked in, which limits its utility as an application and the quality of any solutions provided (e.g., a model may not capture all the physics required). The Dymola® simulation software functionalities represented in the figure essentially boil down to several simplified models interacting with one another through their interconnected inputs and outputs. The solution that is produced from this will have limited insight as most of the physics are absent.

Also, the Dymola® simulation software functionalities represented in figure do not readily account for the use of non-standard components in the same was that the systems and techniques disclosed herein do. Solutions provided by Dymola® simulation software are useful in systems level simulation where there is not much complex physics interaction among other components. It is more common to encounter scenarios however, where the physical behavior of each component inherently depends on others. In other words, there is no clear way to isolate each component into a FMU block. In some implementations, the systems and techniques disclosed herein is aimed to tackle such complex cases.

Handbook and Look up Table Approach

A more cumbersome approach taken by some software is to incorporate handbooks and/or lookup tables into their code. In some instances, this approach may integrate with the physics but, if done at all, it is done in a very limited manner. This sort of approach tends to be effective only for very simplistic components. The approach relies primarily on the use of data from handbooks or tables, that may be stored by the system, that approximate the behavior of modeled components.

Figures 4, 4A:
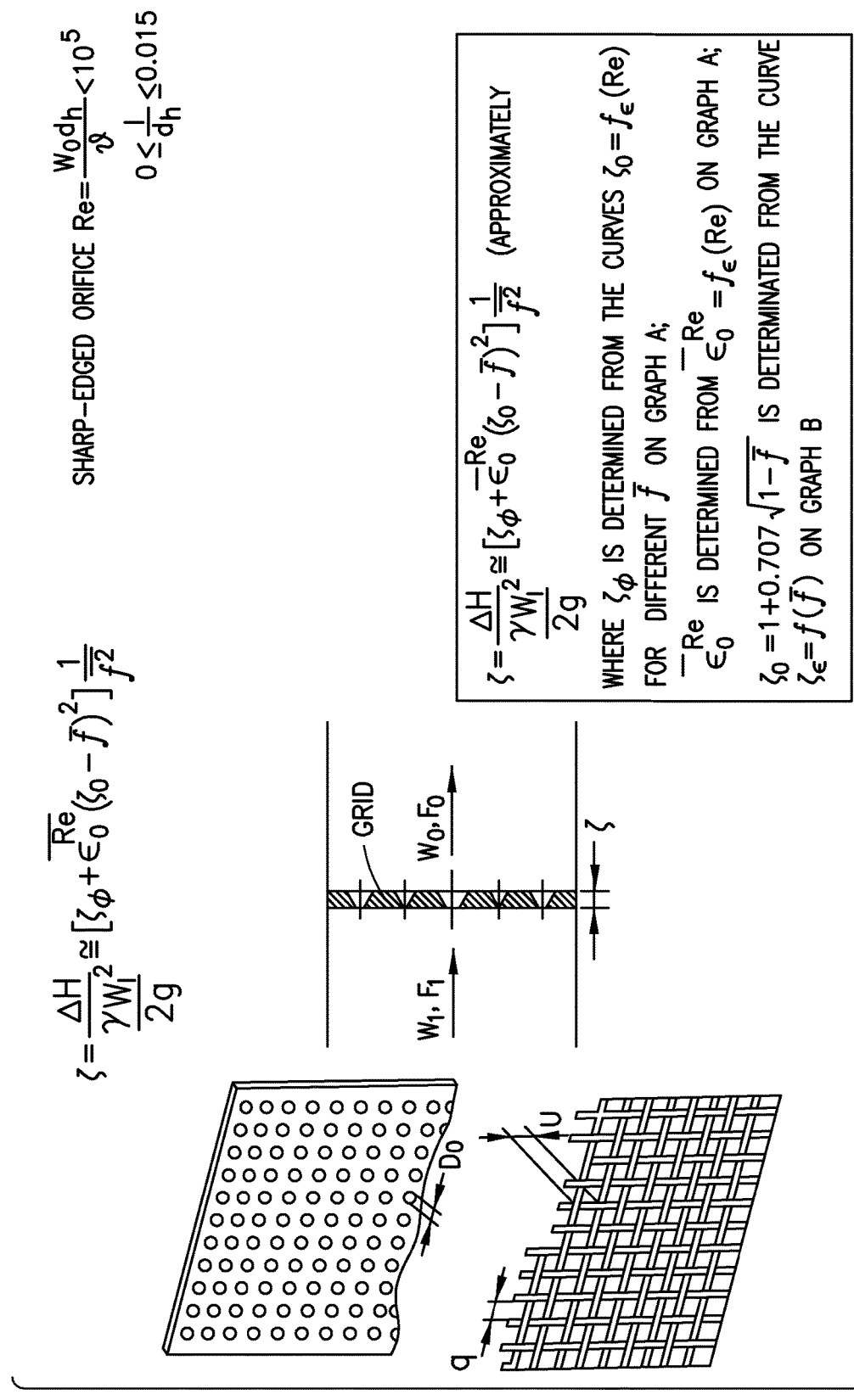
FIG. 4 is a schematic representation of a simulation utilizing a prior art handbook or lookup table information.
Figure 4B:
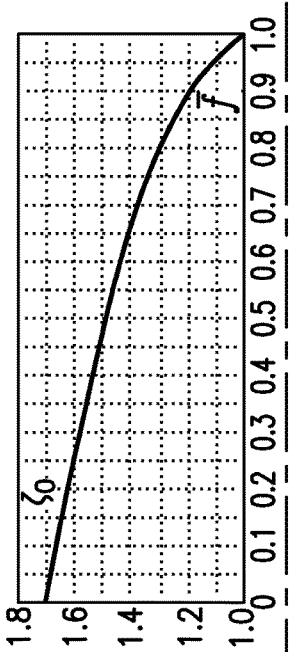
Figure 4C:
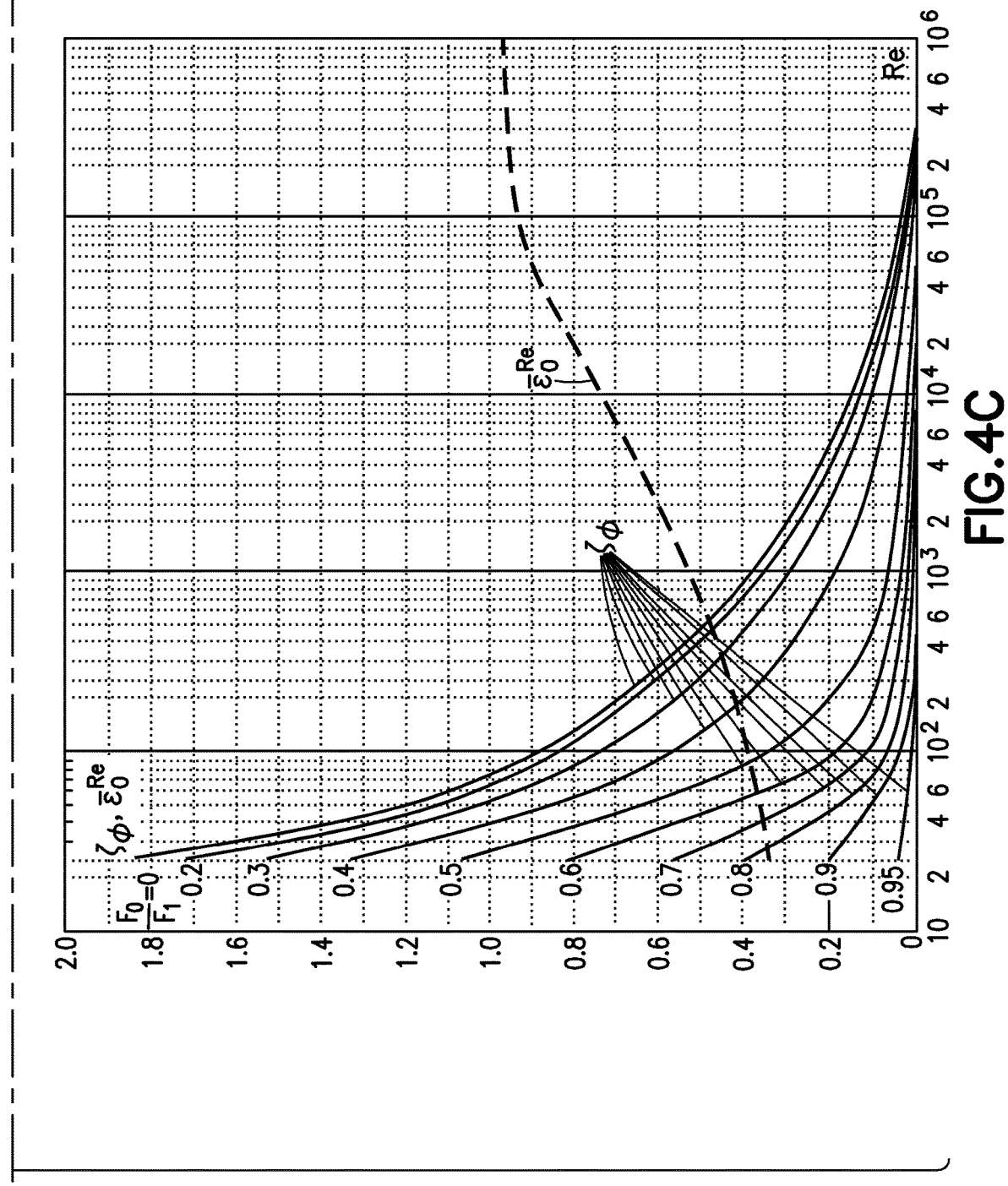

FIG. 4 shows an example of how one such component may be modeled today utilizing a handbook/look up table style approach. The component being modeled is a perforated plate.

The workflow represented in that figure uses tables and handbooks to model the effect of perforated plates. The user uses a handbook that provides an empirical and heuristic model that characterizes the effect of the perforated plate on a solution variable value (in this case the variable value is pressure). The model has several tuning parameters that depend on the input solution, other solution variable values (velocity, turbulence, temperature, etc.), characteristics of the component (geometry, material, etc.). The values these tuning parameters take are obtained by looking up tables, graphs in the handbook and correlating it with the geometry and operating condition of the plate. These graphs and tables are produced by the author of the handbook running experiments on a few subset variations of the component, that too under a limited range of operating conditions. This methodology is limited in the ease of operation, the flexibility and scope of its application. Further there is no clear way to model a component that does not follow the standard design patterns the handbook has assumed. It can be hard to capture handbook data for several special cases (e.g., thick vs. thin plates, high Re vs. low, screens, plates, beveled holes, etc.). Besides these limitations, handbooks are frequently out of date and associated code may need to be updated on a regular basis.

In various implementations, the systems and techniques address and overcome the foregoing, and other, shortcomings of prior simulation techniques.

FIG. 1 is a schematic representation of an exemplary computer system 5000 that can perform simulations that integrate calibrated models with physics-based computations according to one or more techniques disclosed herein.

The computer system 5000 has a processor (e.g., central processing unit, CPU) 5002, computer-based memory 5004, computer-based storage 5006, a network interface 5008, an input/output device interface 5010, and a bus that serves as an interconnect between those components. In a typical implementation, the bus provides a communications medium over which the various components of the computer system 5000 can communicate and interact with one another.

The processor 5002 is configured to perform various computer-based functionalities, including those disclosed herein. Typically, the processor performs these functions by executing computer-readable instructions from a non-transient computer-readable medium, such as computer-based memory 5004 and/or computer-based storage 5006, and/or from computer-readable data received from an external source via the I/O device interface 5010 and/or the network interface 5008, for example.

The computer-based memory 5004 provides a form of volatile storage for computer-readable instructions that, when executed by the CPU 5002, cause the CPU to perform various computer-based functionalities including, for example, those disclosed herein related to generating simulations by integrating calibrated models with physics-based computations.

Computer-based storage 5006 provides a form of non-volatile storage for software instructions, such as an operating system (not shown), and embodiment configuration information, etc.

The network interface 5008 is for connecting to any variety of computer-based or communications networks, including, for example, local area networks (LANs), and/or wide area networks (WANs) such as the Internet.

The input/output device interface 5010 is configured to act as a connection interface for one or more input and/or output devices such as a keyboard, mouse, display, speakers, etc. In a typical implementation, the computer system 5000 may be configured so as to display (e.g., on a display device connected to the I/O device interface 5010) a visual representation of simulation data and the like related to integrating calibration models with physics-based computations.

In various implementations, the computer system 5000 may have additional elements, such as controllers, buffers (caches), drivers, repeaters, and receivers, to facilitate communication and other computer-based functionalities. Further, the interfaces may include address, control, and/or data connections to facilitate communication among the illustrated components.

Figure 6:
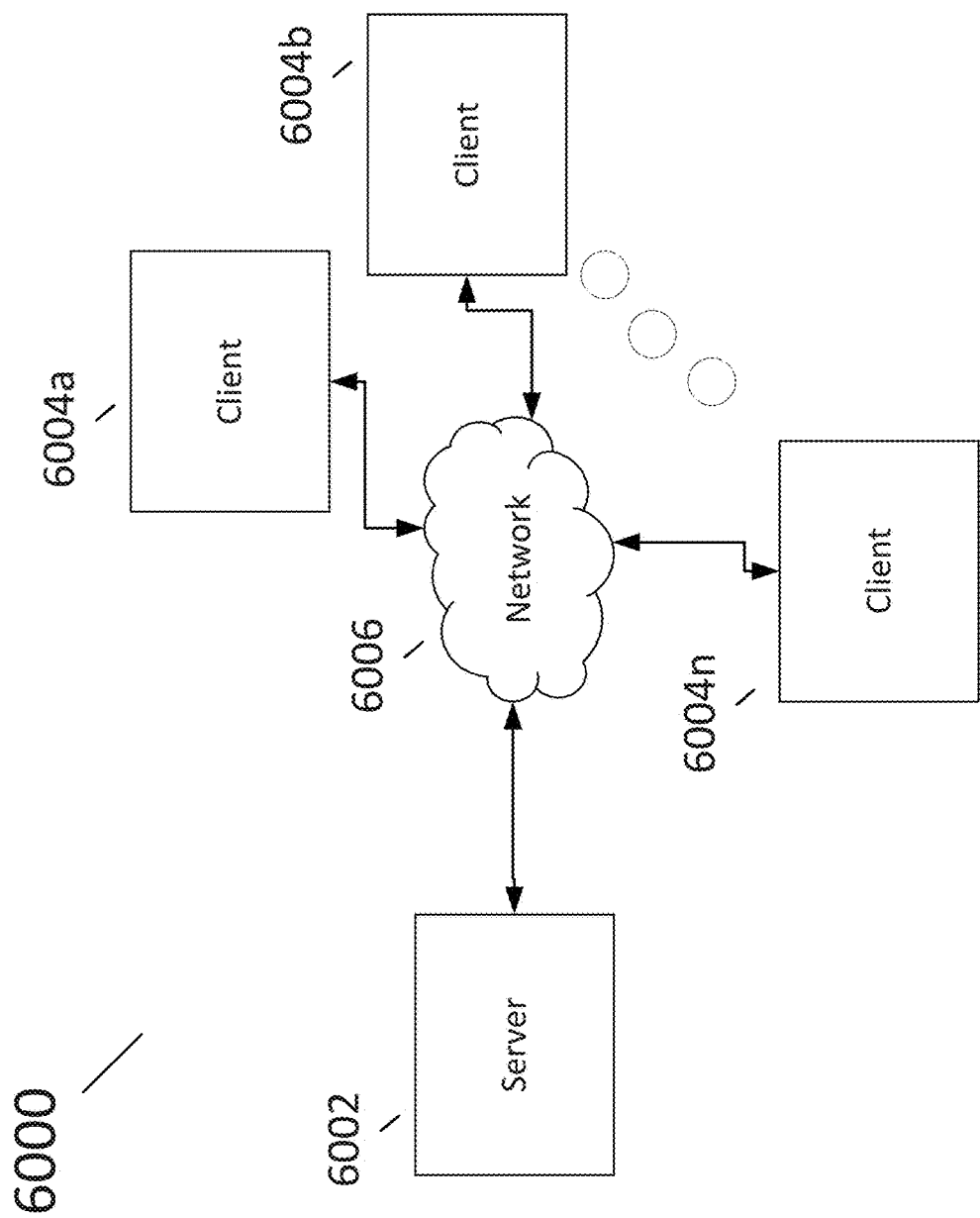
FIG. 6 is a schematic representation of an exemplary computer network environment 6000 that may be used to perform simulations that integrate calibration models with physics-based computations according to one or more techniques disclosed herein.

FIG. 6 is a schematic representation of an exemplary computer network environment 6000 that may be used to perform simulations that integrate calibration models with physics-based computations according to one or more techniques disclosed herein.

The computer network environment 6000 has a server 6002, and clients 6004*a*, 6004*b*, . . . 6004*n* coupled to one another via a communications network 6006 that enables the server 6002 and clients 6004*a* to communicate and interact with one another. In a typical implementation, every client 6004*a*, 6004*b*, . . . 6004*n* and the server may include the same types of components that are shown in the computer system 5000 of FIG. 5. In some implementations, each client 6004*a*, 6004*b*, . . . 6004*n* may be configured to perform the functionalities disclosed herein including, for example, to perform simulations that integrate calibration models with physics-based computations without requiring involvement of the server 6002. In some implementations, the functionalities disclosed herein to perform simulations that integrate calibration models with physics-based computations may be distributed between the server 6002 and a client (e.g., 6004*b*), with the server 6002 providing, for example, cloud computing functionalities in the context of software as a service (SAAS).

Figure 7:
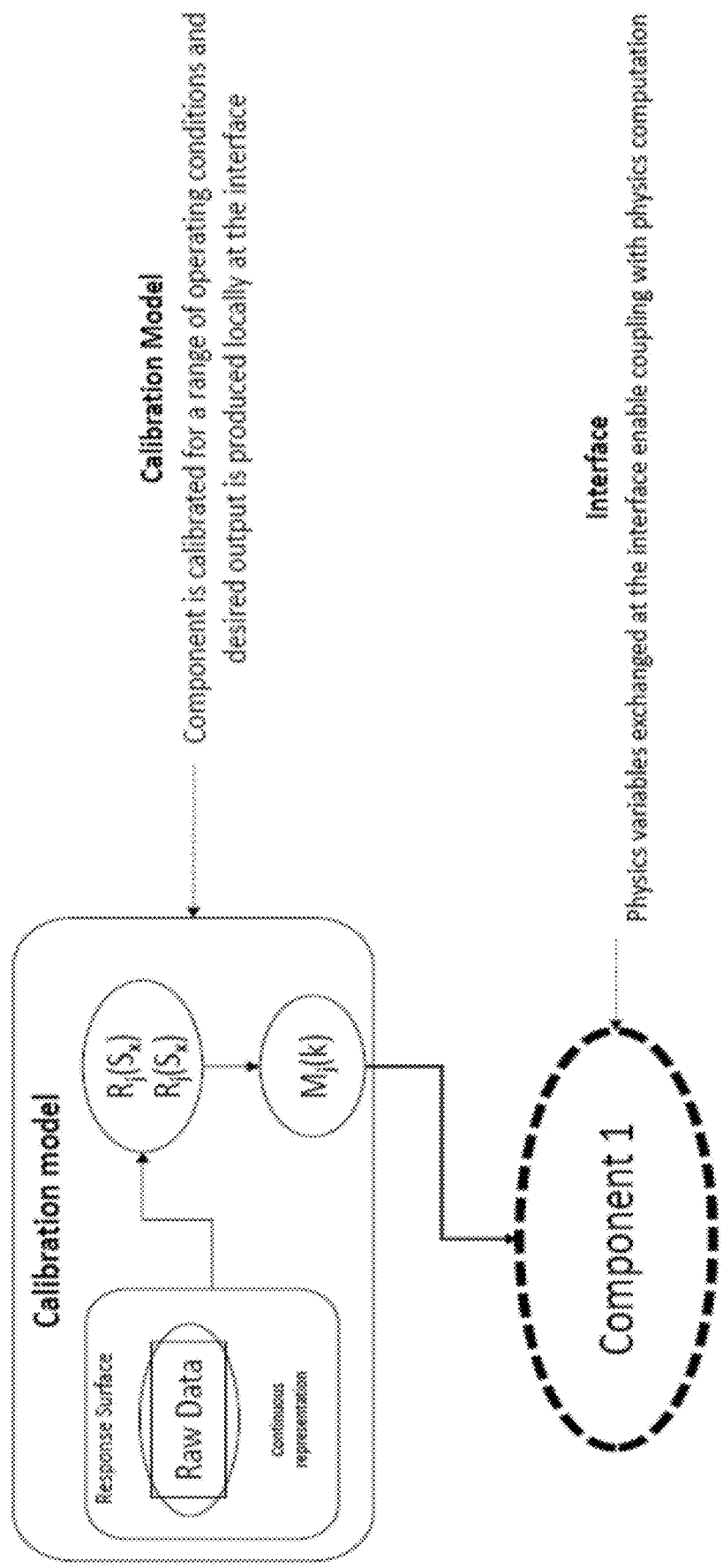
FIG. 7 is a schematic representation of a calibrated model of a component coupling with a computational physics simulation via an interface that surrounds the calibrated model of the component.

In a typical implementation, the systems and techniques disclosed herein facilitate coupling component modeling with computational physics in the same simulation. This approach is represented in FIG. 7, which shows, schematically, a calibrated model of a component (component 1) coupling with a computational physics simulation via an interface that surrounds the calibrated model of the component. In a typical implementation, physics variable values are exchanged between the calibrated model and the computational physics simulation at the interface. Moreover, the calibrated model of the component is calibrated for a range of operating conditions and desired output is produced locally at the interface. Details on how a calibrated model is developed is elaborated in the co-pending patent application entitled In-situ Formulation of Calibrated Models in Multi Component Physics Simulation.

Considering a thermal electronics workflow example, electronic modeled components in a simulation may be presented by a very detailed physical description. Some of these physical descriptions may be represented, in a virtual environment, by CAD geometry, orientation data, material model data, data representing discretized computational grid points distributed along the geometry, etc. The detailed physical description of the component may be required if a particular application requires that the component's physical behavior to be exhibited as a result of the physical computation of the solution. This can be a tedious and time-consuming endeavor. This endeavor, however, may be an unnecessary undertaking especially if one only cares about the component's effect on the solution since this effect can be modeled in a calibrated model.

Thus, in some implementations, the detailed physical description of a modeled component can be simplified and significantly reduce the computational grid points assigned to the component. Furthermore, a calibration model may be developed that mimics the behavior of the component by modifying the solution accordingly. This results in significant savings in computational effort, model setup, time, and resources.

In the example of a thermal electronics (E-Cooling) workflow, this may be done by replacing the electronic component's geometry with a place holder geometry of roughly similar volume and/or footprint. Furthermore, very few if any computational grid points may be introduced inside this simplified geometry. This simplified geometric volume, surface, or footprint is shown in FIG. 7 as an ellipse that is titled "Component 1."

The surface/edge/boundary immediately surrounding the simplified representation (calibration model) of the component is termed an interface (or interface boundary) also shown in FIG. 7. In a typical implementation, the interface boundary enables coupling of the solution being computed outside the calibrated model with the calibrated model modifying the solution inside the calibrated model. Note that, in a typical implementation, there are no specially designated inputs or outputs. The solution variable values are free to flow in any direction across the interface and the flow direction (whether in or out) can vary along the boundary. This allows the system to integrate the computational physics regions with the modeled regions seamlessly.

In the schematic representation of FIG. 7, the rounded rectangle titled "Calibration Model" represents the entity that effects change in the solution. It is responsible for modifying the solution in an appropriate manner so as to mimic the physical behavior of the component being modeled. The calibrated model not only modifies the solution but can be made to evolve with the solution providing a higher degree in the fidelity of the solution. In this regard, in a typical implementation, it is possible some of the environmental or operational or external or geometric parameters are dependent on the solution variable values [R], then as the solution evolves, these [E, O, D, G] may also change there by requiring a new $M_j$ for each update in solution. For example, if the perforated holes in a modeled perforated plate expand and contract due to temperature changes, this would be a case where the temperature (a solution variable value) affects the hole diameter (geometric parameter). The calibrated model $M_j$ is specific for a certain hole size, if the hole size changes, a new $M_j$ will be provided.

The model is called "calibration" model as the model created produces a calibrated response to the input solution by creating an appropriate adjustment/transformation of the solution variable values. The calibration model is representative of the physical characteristics of the component. In the example of the perforated plate, as a solution variable value (e.g., air velocity and/or pressure) enters one side of the plate, the calibration model spatially modifies the solution (turning the velocity field along a hole direction with an accompanied drop in pressure) as the air exits on the other side of the plate in such a way that the downstream effect on the solution is as if the flow went across a perforated plate with some specified hole density, free area ratio, etc. A calibrated model for a component can be adapted to variations in its design, usage, and/or other changes within reasonable bounds. Reasonable bounds can mean different things in different contexts. In some instances, for example, reasonable bounds may mean that if the techniques create calibrated models for a range of plate thickness values [e.g., 1 mm to 5 mm], this calibrated model may work for plate values up to 6 mm. The accuracy of the model may drop the further away a particular plate value gets from the aforementioned range [e.g., 1 mm to 5 mm]. For example, a plate of 20 mm thickness may be considered out of reasonable bounds as some other physics begin to take place when having such a deep 20 mm long hole. In such instances, the same calibrated model will not be generally usable to model these physical effects. The notion of reasonable bounds is hard to otherwise quantify. It generally depends on sensitivity of the model to each parameter. If the model is highly sensitive to changes in thickness vs. hole diameter, then it implies 0.5 mm thickness variation (3 mm vs 3.5 mm) may have a bigger impact on a solution vs. a 0.5 mm change in diameter (3 mm vs 3.5 mm diameter). The reasonable bounds for thickness variations tends to be tighter than that for diameters.

If a component is fundamentally very different in its physical response, the methodology allows for the calibration model to be updated/formulated live. This is elaborated below and in the co-pending patent application entitled In-situ Formulation of Calibrated Models in Multi Component Physics Simulation, mentioned above. The expected response or purpose of the perforated plate is to affect the flow velocity direction and the pressure across its thickness. Thus, if a perforated plate is presented for example with a very different pattern of holes and geometric shape, then a new calibration model for this plate can be formulated for as long as its response is still meant to affect the pressure across its thickness and flow velocity direction.

Figure 8:
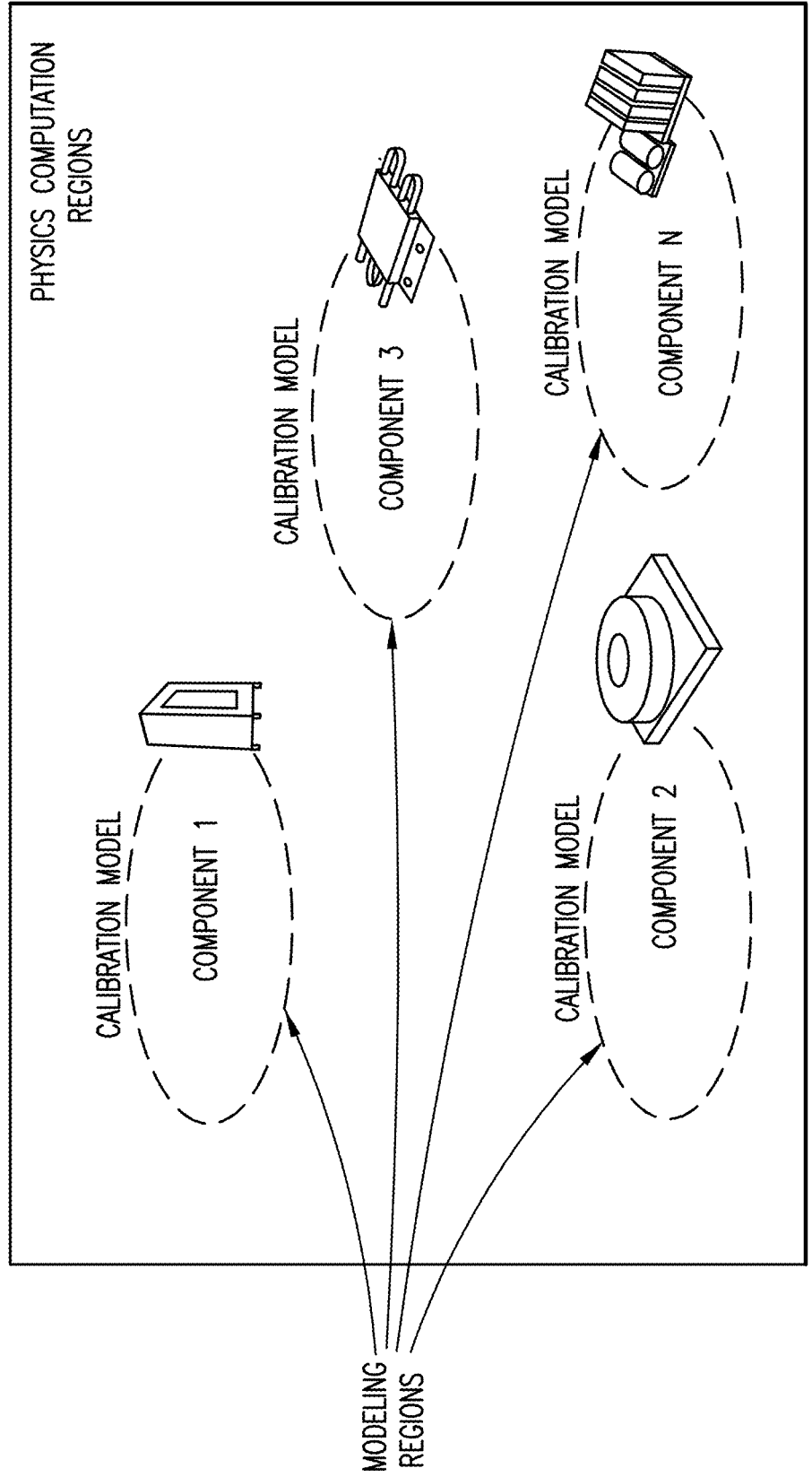
FIG. 8 is a schematic representation of a simulation that integrates multiple calibration models of different components with rigorous, mathematical physics-based computation at the interface boundaries of the calibration models.

FIG. 8 is a schematic representation of a simulation that couples multiple calibration models of functionally similar and/or functionally different components with a rigorous, mathematical physics-based computational at the interface boundaries of the calibration models. The example represented in the illustrated figure includes N separate components, where N can be any number (component 1, component 2, component 3 . . . component N) represented by calibration models, with each calibration model having its own interface boundary that couples the calibration model to the physics-based calculations outside of the interface boundaries.

This figure helps show the concept of assembling calibration models for several e-cooling components within a single simulation. Each component represented by a calibrated model in the illustrated implementation is an e-cooling component in an electronic appliance of the type that can be modeled. More specifically, in the illustrated implementation, component 1 is a perforated plate, screen, or grill (e.g., for ventilation), component 2 is a blower fan, component 3 is a heat pipe assembly, component N is a heat sink with fins. In various implementations, of course, there may be more than one of the same type of component (e.g., heat sinks) in a particular assembly (e.g., electronic appliance). In such instances, each instance of that component type may be represented in a virtual simulation that includes physics-based computations as a separate calibrated model. In these type of instances, the savings in computational resources, time, effort, model setup, etc. may be magnified several fold.

Figure 9:
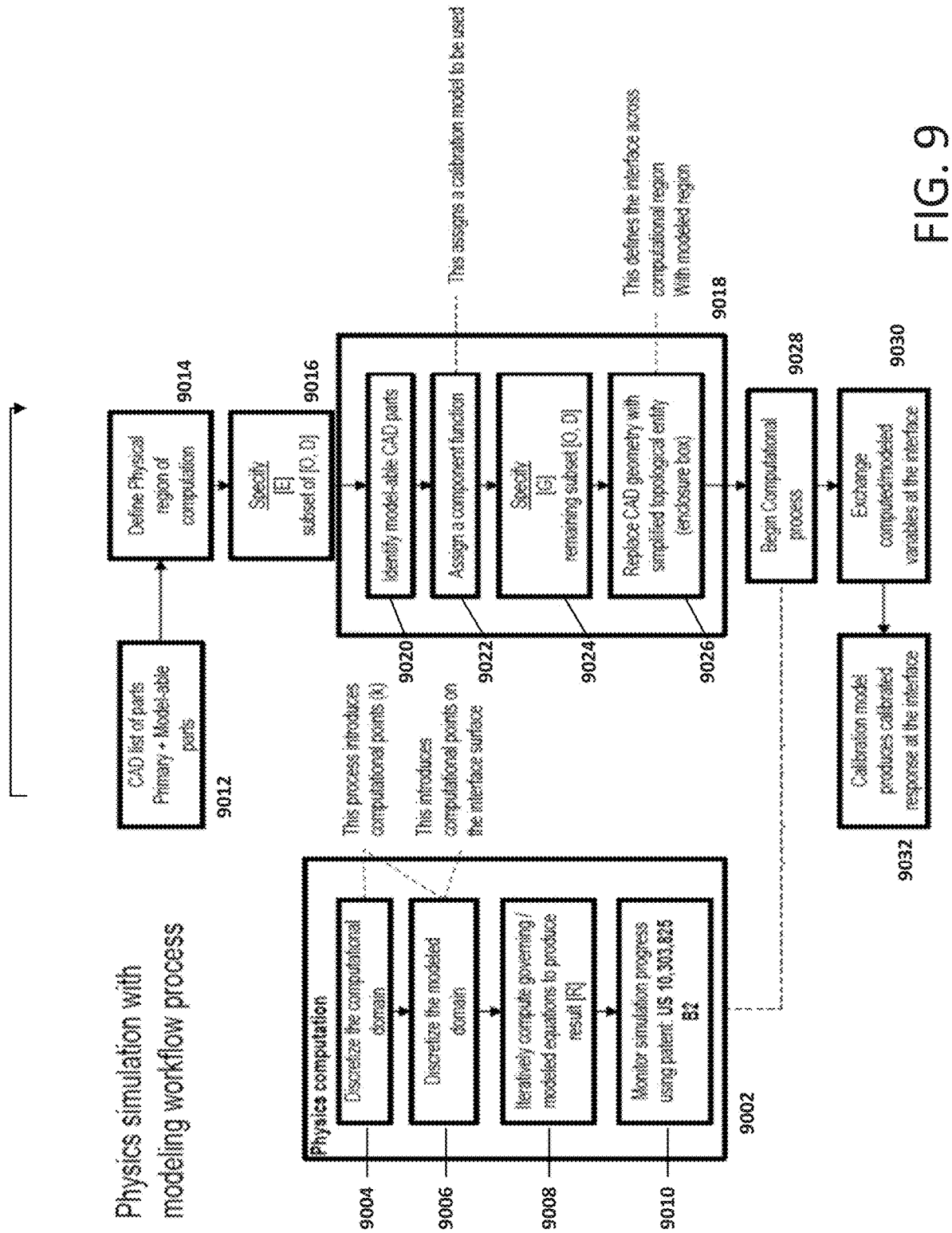
FIG. 9 is a flowchart that represents an exemplary process for integrating calibrated models with computational physics in a simulation.

FIG. 9 is a flowchart that represents an exemplary process for integrating calibrated models with computational physics simulations. In general, two types of users interact with a calibrated model. As used herein, a "developer" is a user who develops a knowledge base for the calibrated model, consisting of a library of experimental results incorporated by the calibrated models for a corresponding component. A "consumer" is a user who integrates calibrated models into computational physics simulations. The word "user" may be used to denote either a consumer or a developer.

Figure 5:
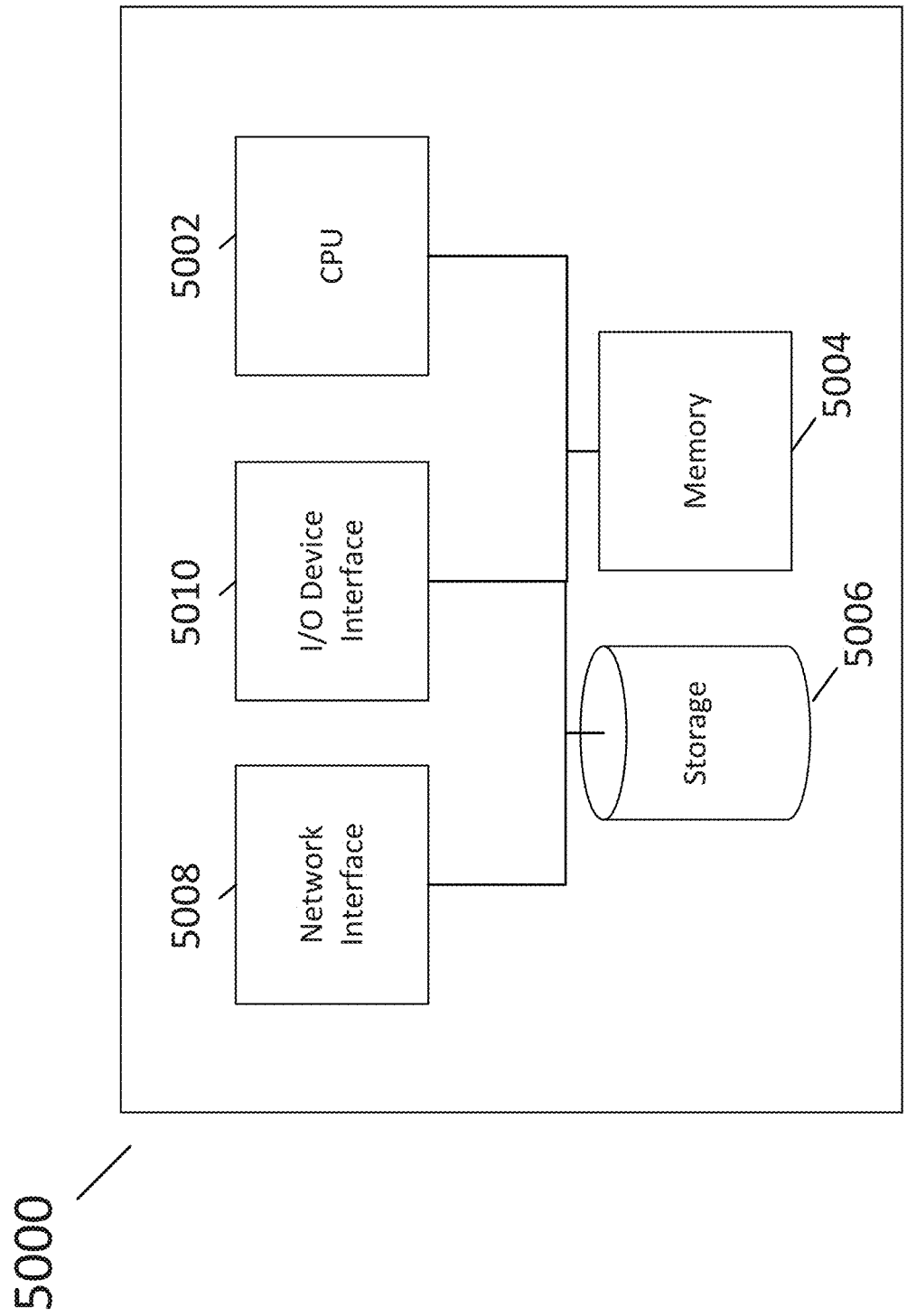
FIG. 5 is a schematic representation of an exemplary computer system that can perform simulations that integrate calibrated models with physics-based computations according to one or more techniques disclosed herein.

In a typical implementation, one or more of the steps represented in the illustrated flowchart attributable to a computer may be implemented by the computer system 5000 of FIG. 5, with the processor 5002 performing the indicated functionalities, memory (5004 or 5006) storing instructions for performing the indicated functionalities that the processor 5002 performs by executing the functionalities, the computer system 5000 interacting with other network components, as needed or convenient, via the network interface 5008, and a user(s) interacting with the computer system via one or more user interface devices coupled to the I/O device interface 5010.

The illustrated process includes some steps specifically associated with the physics computations portions of the simulation (i.e., outside of the virtual space occupied by any calibrated models), and other steps associated with calibration models and integrating the calibrated models into the physics computations.

In a typical implementation, the process includes a simulation setup whereby a user (at 9012) defines the simulation with all the primary components required (including CAD geometry of all the parts) and optionally defines geometry of any secondary components (e.g., CAD geometry of any e-cooling components). As used herein, and unless otherwise indicated, in order to distinguish between components in which consumer only wishes to mimic versus compute the components effect on the solution variable values the components that are able to be modeled are referred to as secondary components and the rest are referred to as primary components.

Moreover, in the simulation setup, the user (at 9014) defines a physical region of computation. Additionally, in the simulation setup, the user (at 9016) specifies all of the environmental parameters (denoted as an array $E=[e1 \ldots el])$), operational parameters (denoted as an array $O=[o1 \ldots om])$) and, if any, external parameters (denoted as an array $D=[d1 \ldots dn])$). Up to this point, simulation setup may be done in a traditional manner.

The process represented by the illustrated flowchart includes physics-based computation processes 9002. Implementations of some of the steps represented in the physics-based computation processes 9002 are disclosed in the applicant's own co-pending U.S. patent application Ser. No. 16/874,977, entitled Mesh Void Space Identification and Auto Seeding Detection in Computer Added Design Defined Geometries, and in U.S. Pat. No. 10,303,825, entitled, Convergence Estimation of Non-Linear PDE and Linear Solvers. For example, co-pending U.S. patent application Ser. No. 16/874,977 discusses discretization techniques that may be utilized in the physics-based computation processes 9002 and U.S. Pat. No. 10,303,825 discusses techniques for monitoring simulation progress that may be utilized in the physics-based computation processes 9002. Each of these prior documents is incorporated herein by reference in its entirety.

The physics-based computation processes 9002 represented in the illustrated flowchart includes discretizing the computational domain (at 9004) with discrete computational grid points (meshing process). This process introduces a number of computational points (k). The physics computation process 9002 further includes discretizing the modeled domain (at 9006). This introduces computational points on any interface surfaces. Next, the physics computation process 9002 includes (at 9008) iteratively computing governing/modeled equations to produce a result (i.e., a set of solution variable values ($R=[r1 \ldots rp])$)). This step typically involves solving governing equations at every computational point. Several techniques exist for performing this step and are specific to the physics being computed. As an example, computational fluid dynamics governing equations can be solved by using finite volume methods, lattice Boltzmann methods, finite element methods, etc. Next, according to the process represented in the illustrated flowchart, the system (at 9008) iteratively computes the governing/modeled equations to produce a result [R], which may be represented, for example, as an array. The system (at 9010) monitors simulation progress, which may be performed by implementing techniques disclosed in the above-referenced patent (U.S. Pat. No. 10,303,825).

There are a number of ways in which the system may iteratively compute the governing/modeled equations to produce the result [R](at 9008) and monitor simulation progress (at 9010). In one exemplary implementations, the process may include: a) if initial conditions not provided, assuming an educated guess of the solution variable values field at every computational point (e.g., velocity, temperature, pressure, etc.) Call this guess $R^0$, b) using some metric (e.g., residuals, typically, or error estimates as disclosed in the patent referenced above, U.S. Pat. No. 10,303,825), evaluating how well the solution guess $R^0$ satisfies the "discrete" version of the governing equations (note that it likely may be that the solution guess at some locations satisfies the governing equations better than at other locations), c) evolve the guess in some algorithmic way based on math and physics principals to produce a new solution guess $R^1$, d) repeat steps (b)-(c) updating the solution with each iteration until the governing equations are satisfied to a satisfactory level (e.g., as determined and/or specified by the user upfront). The last iteration solution field, call it $R^n$, is the computed result. Physics computation techniques can vary in how the governing equations are discretized to obtain their discrete versions. They also can differ in the manner in which the iterations are performed if iterations are performed at all. To contrast the guessing-to-predict approach just described, in some implementations, a physics-informed, artificial neural network may be utilized to predict an initial guess. Here, the solution may be guessed from training a neural network for a preset number of problems where the solution is known (training data). The neural network in this kind of example may have several tunable parameters that get tuned when being trained with the training data. The neural net after being trained is now in a position to predict a solution field for a new problem (i.e., a new simulation setup) and the guess can be evaluated using the same or similar metrics as described above.

Turning now to use of calibrated models, according to the process represented in the illustrated flowchart, a user (at 9020) identifies one or more parts represented in the CAD information that can be modeled (e.g., a part for which the system has stored in memory a calibrated model). In a typical implementation, the user in this regard would select the particular part in the assembly to be simulated that can be modeled (e.g., with the stored calibrated model). Next, the user (at 9022) assigns a component function to the selected part. In doing this, the user essentially assigns a particular one of the available calibrated models, that represents the associated component function, to represent, or stand in for, the selected part in the simulation. Next, the user (at 9024) specifies one or more characteristics of the selected part/calibrated model. These characteristics can include, for example, one or more geometrical characteristics (G=[g1, . . . , gk]), one or more operation parameters (O), and/or one or more external parameters (D), if any, that may be relevant to the selected part in particular. If, for example, the user (at 9022) has assigned "heat sink" as a component function to one or more selected CAD parts, then the user (at 9024) might provide information about the specific heat sink represented by the selected CAD parts. This information might include, for example, fin thickness, fin height, fin density, fin angle, etc. In a typical implementation, the mere act of tagging the CAD part in the simulation as a modeled component of a certain type (e.g., a heat sink) may amount to providing some information about the selected part's geometrical characteristics (G).

The user up to now has tagged the CAD geometry (9020), provided the function (9022), parametric details (9024) of the secondary component. With this information the system is able to deduce the geometric footprint of the secondary components. Next, the user may provide some additional clearance information (9018) after which, the system (at 9026) replaces the selected CAD geometry (selected parts) with a simplified topological entity (e.g., a virtual enclosure).

The simulation started with the full CAD description of all the components (primary+secondary)—box 9012. The system as 9012, therefore, knows the extent of each component. So, if a user picks one of those components and assigns it a function (e.g., heat sink) and chooses from the available heat sink calibrated models an appropriate model, the software will automatically replace the CAD geometry's footprint with an appropriate simplified geometry. The user can fine tune the fit by specifying some tolerances (since usually the system may have some clearances). For example, if there is a heat sink represented in the CAD description that is 10 mm tall×100 mm deep×100 mm wide, then the simplified box may have clearances of 5 mm on all sides (except at the base, i.e., where the geometry connects with the primary part) so the box in this example would be 15 mm tall×110 mm deep×110 mm wide.

In a typical implementation, the enclosure is contoured, dimensioned and positioned to surround and/or contain the selected part allowing for some minor clearances if any. Typically, the enclosure does not follow every contour and outline every detail of every surface of the part. Instead, it more typically, roughly surrounds the part so as to define a barrier that separates areas outside the part where rigorous physics-based computations will be performed as part of the simulation, and areas inside the part or very close to the part whose behavior will be indicated by the simpler calibrated model of the part interacting with more rigorous physics-based computations that occur outside the barrier. The surface of the enclosure represents an interface or interface boundary that separates the modeling domain/region from the computational region. In some implementations, the discretization discussed above may be extended to include discretizing the now replaced enclosure box as well thereby introducing computational points on the interface boundary.

In a typical implementation, the modeled region carved out (in 9026) depends strongly on the geometric parameters [$G_j$] of the secondary component to be replaced. Further, in some implementations, it depends on the component type and the region that was used when the calibration model was developed. For example, heat sinks will generally be replaced with an enclosure box if the calibration model was developed using an enclosing box, which is typical. If the calibration model was developed using a sphere, on the other hand, then the enclosing geometry would be a sphere instead of a box. In a typical implementation, the dimensions of the box or sphere are related to the geometry of the heat sink in some functional manner that is captured by the calibration model. For example, if the length of the box enclosing the heat sink is twice the length of the heat sink in that direction then based on the specific simulation j, the enclosing box will be scaled based on the heat sink size to be modeled. The calibration model is generally able to automatically produce the enclosing geometry once provided [$G_j$, $D_j$, $O_j$].

Next, according to the process represented by the illustrated flowchart, the system begins the computational process (9028), which may include both physics computations (9002) as well as part modeling by calibrated models. The process includes an exchange (at 9030) of computed and modeled variable values at the interface of any calibrated models. Moreover, the process includes (at 9032) any calibrated models producing calibrated responses at the interface.

Figure 10:
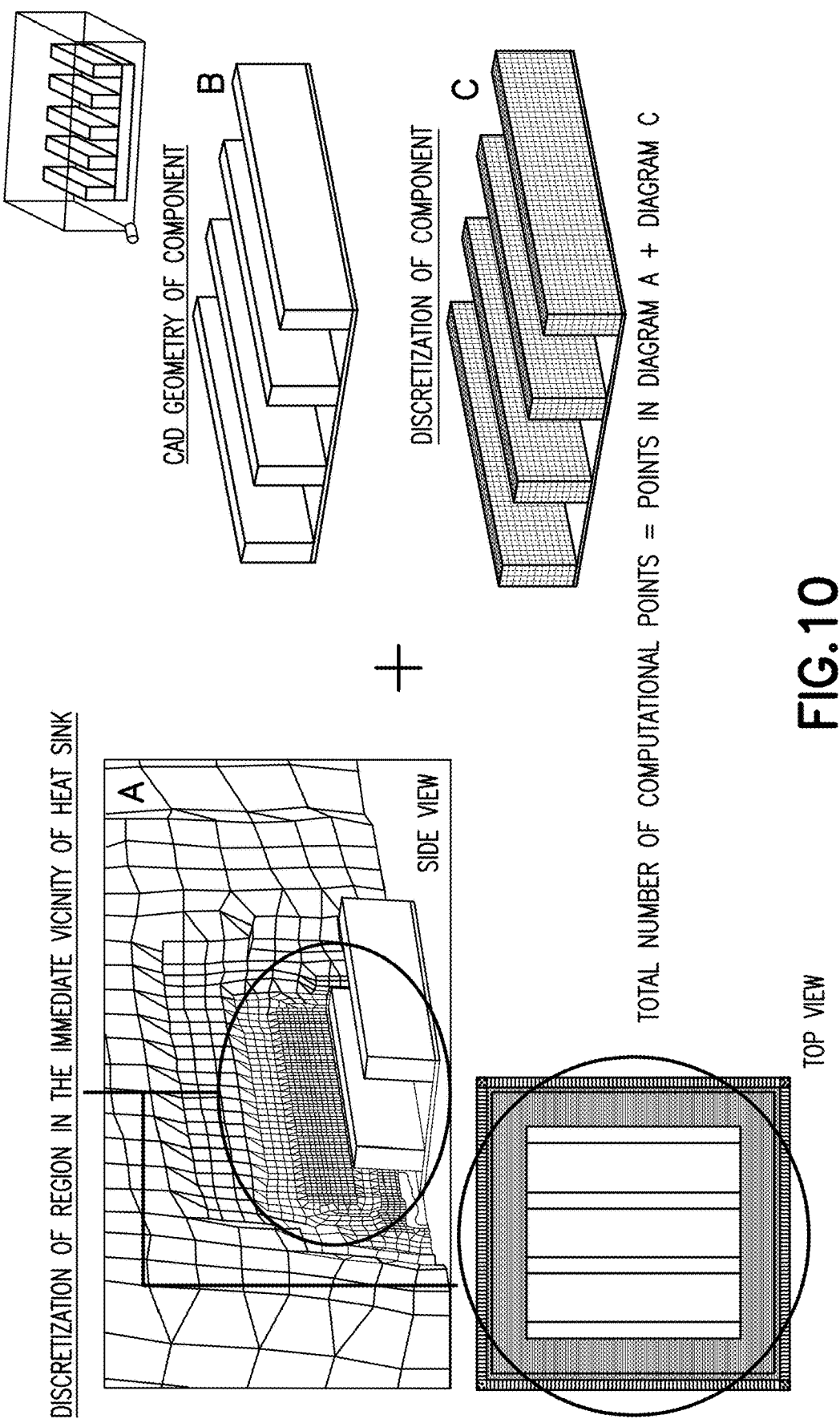
FIG. 10 is an illustration showing aspects of computational complexity without modeling.
Figure 11:
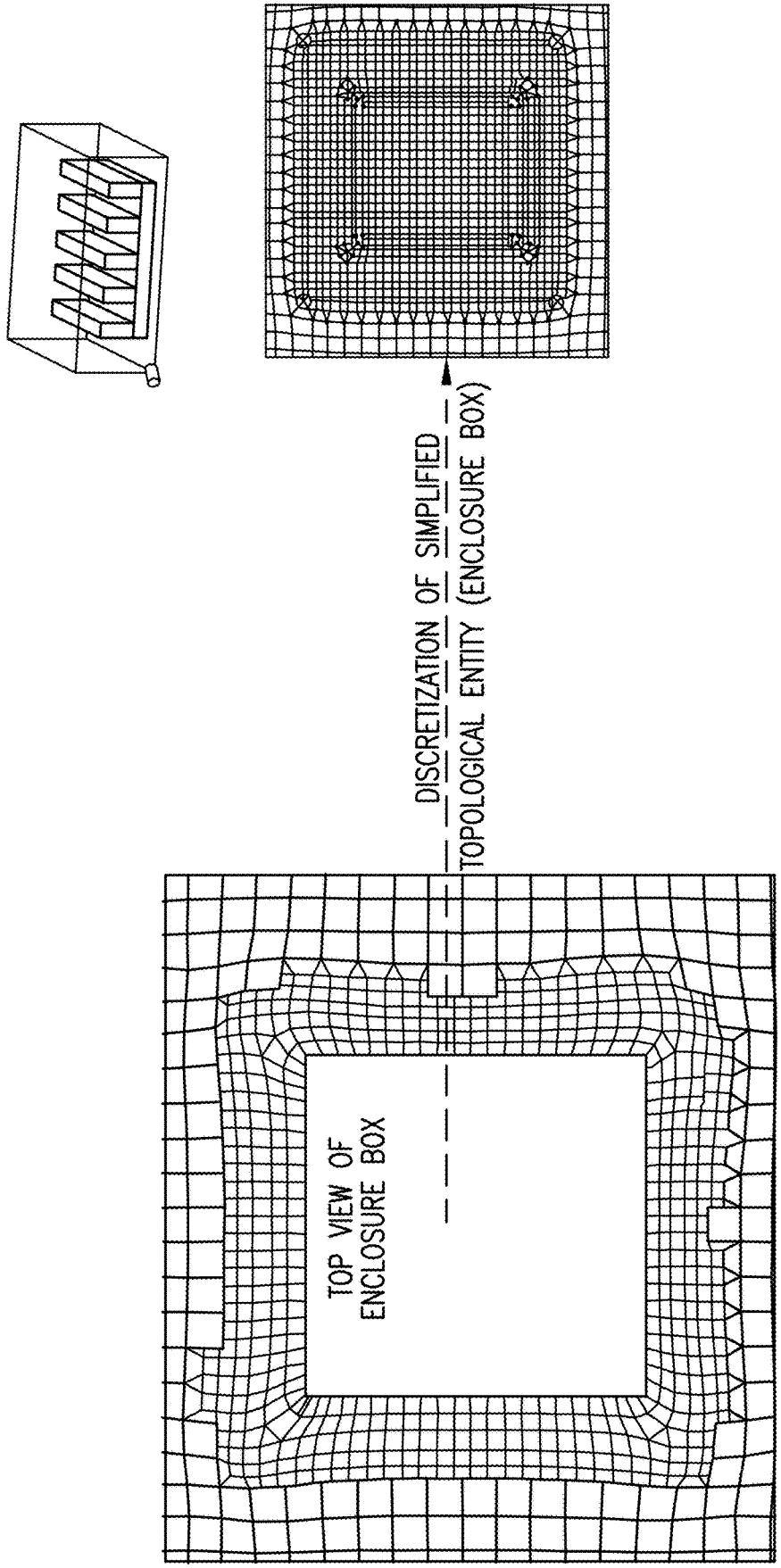
FIG. 11 is another illustration showing aspects of computational complexity without modeling.
Figure 12:
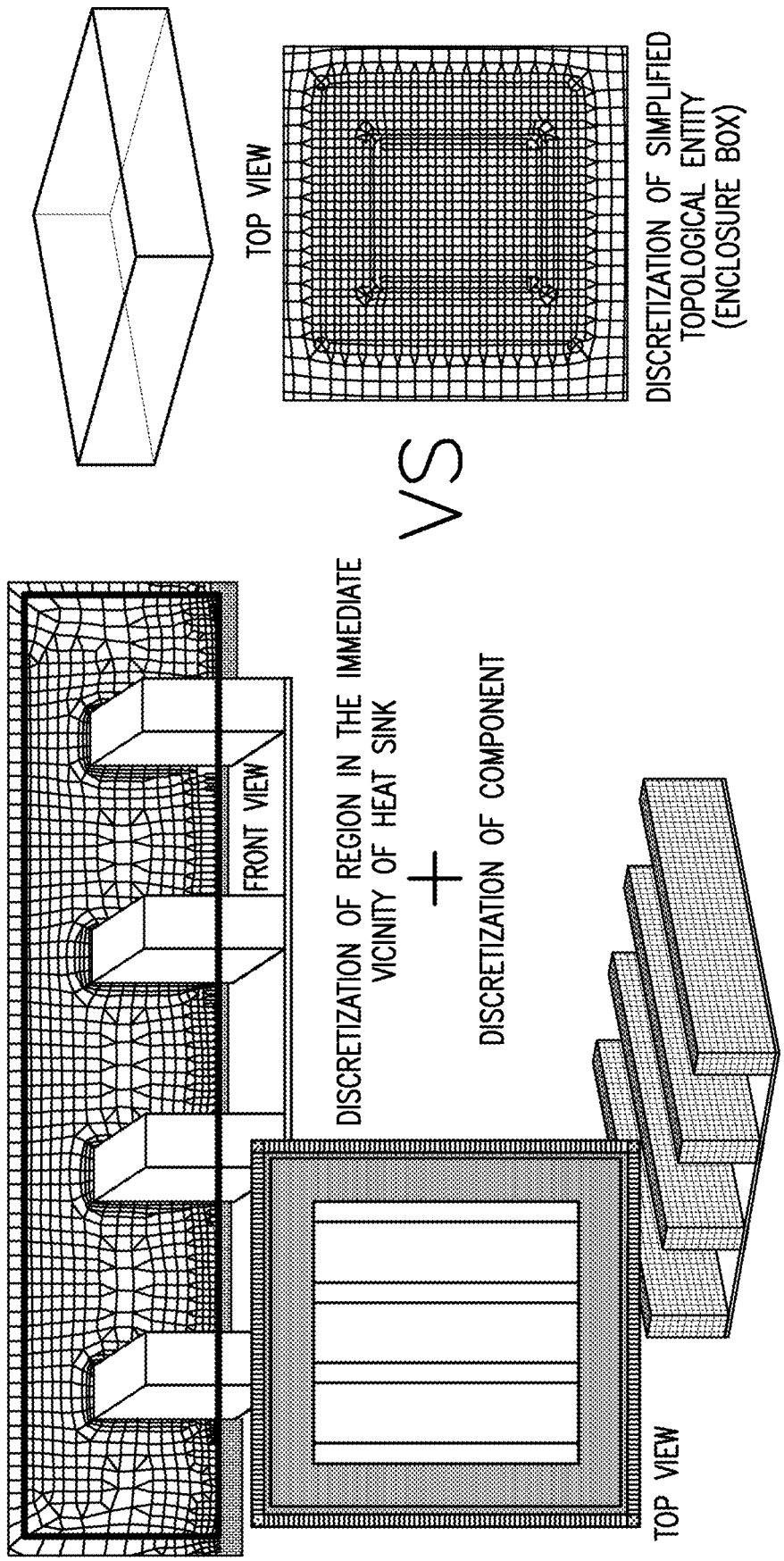
FIG. 12 is an illustration comparing computational complexity without modeling vs. that of a modeling approach.

In a typical implementation, the systems and techniques disclosed herein produce savings in computational points by using calibrated models instead of using more rigorous physics simulations, especially for secondary components (e.g., e-cooling components, etc.). FIGS. 10, 11 and 12 indicate the savings in computational points that can be achieved by integrating calibrated models into an approach that otherwise simulates physics for the secondary components.

FIG. 10, for example, show computational complexity that can exist without any modeling; notice the number of computational points. FIG. 10 (at A) shows a partial side view of a heat sink showing discretization of a region in the immediate vicinity of the heat sink. FIG. 10 (at B) shows CAD geometry of heat sink fins. FIG. 10 (at C) shows component discretization—the entire volume of each heat sink fin is separated into discrete cells. FIG. 10 (top view) shows a top view of the heat sink fins. The total computational points, according to the illustrated example, would include the points in A plus the points in C. Meanwhile, the upper right-hand corner of FIG. 10 shows an example of a calibration model with an interface boundary that can essentially replace the heat sink, and minimize the number of computational points considerably, in a simulation. Note the upper right-hand corner of FIG. 10 has shown for size comparison the CAD geometry of the heat sink along with the enclosure box together. In simulation process described, the complex heat-fin geometry has been eliminated and replaced with just the simple enclosure box.

FIG. 11 shows computational points involved in simulating the physics for a secondary component (such as heat sink) with modeling. One requires distribution of points on the component body and a dense distribution of points around the components so as to capture the physics of a heat sink. The computational points represent those that may be required in one implementation of a modeled approach. This clearly requires a much less dense distribution of points (or none at all) inside the interface enclosure. Some secondary component's modeling does not require points inside but only on the interface surface.

FIG. 12 shows the small number of computational points required in a modeled approach vs a fully physics computed approach. In FIG. 12, the images on the right pertain to the modeling approach. It shows the enclosure box and the computational points inside the simplified topological entity (enclosure box) viewed from the top. Note, the heat sink geometry is absent as we have replaced it in the modeling approach. The left three diagrams pertain to the full physics computation approach. These diagrams depict the number of computational points required in order for the secondary components to exhibit their physical behavior/effect on the solution arising from physics computation. The top two left diagrams are the front and side view of the computational points introduced in the immediate vicinity of the heat sink. The bottom left figure is the number of computational points needed to discretize the heat sink itself. Note that the left and right diagrams depict a volumetrically comparable region. It is immediately clear that the modeling approach requires several orders less computational points than the full physics computational approach.

Figure 13:
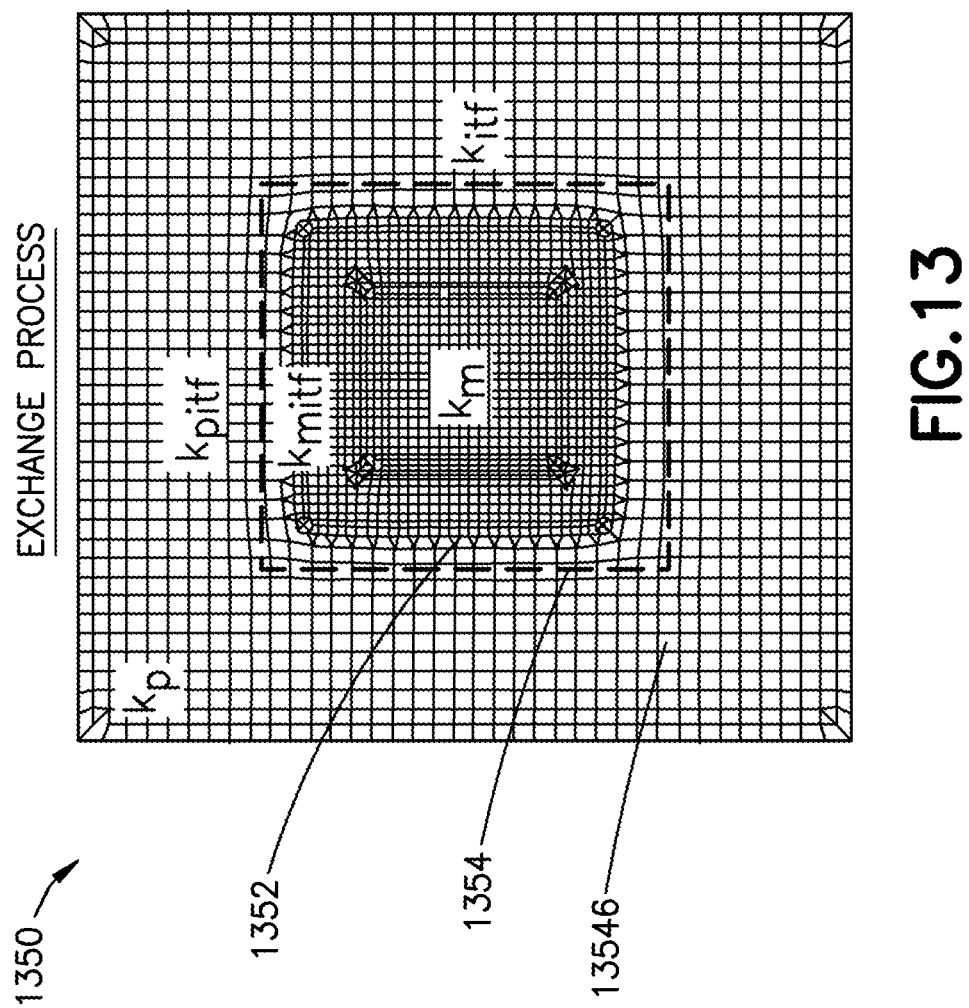
FIG. 13 is a schematic representation of an example of a simulated environment with a calibrated model with an interface boundary integrated into a physics region (e.g., a non-modeled region) surrounding the interface boundary where rigorous physics-based computations are performed to model behavior.

There are a variety of ways in which a calibrated model may produce one or more output values from one or more input values. One example of this can be understood by referring to FIG. 13, which represents an example of a simulated environment 1350 (e.g., a computer-generated representation of a real-world assembly). The simulated environment 1350 has a calibrated model 1352 with an interface boundary 1354 and a physics region 1356 (e.g., a non-modeled region) surrounding the interface boundary 1354 where rigorous physics-based computations are performed to model behavior. Each cell in the mesh pattern in the illustrated figure represents a computational point in the simulation (e.g., a point whereby a solution may be generated based on input data). Each computational point in the illustrated example has neighboring computational points (e.g., computational points that are immediately adjacent to it) except at the far boundaries. Moreover, there are computational points in the immediate vicinity of (e.g., immediately adjacent to) the interface boundary 1354 on both the modeled region side of the interface boundary 1354 and the physics region side of the interface boundary 1354.

In a typical implementation, the computer system (e.g., processor) disclosed herein, in running a simulation based on the virtual environment (saved in memory), would be configured to identify/compute computational points, results/solutions, and modeling and governing equations, based on the following discussion. The processing may be performed in accordance with the steps in FIG. 9, which may include computations and approaches such as those detailed herein. Any input data required for these processes, including, for example, CAD data, and environmental parameters, operational parameters, and/or external parameters may be received entered into the computer system by a user through one or more user interface devices and any outputs produced by the system may be outputted to one or more user interface devices for assessment by a user. The output can be provided in a wide variety of formats (e.g., in the form of a 2 or 3 dimensional visualizations (e.g., heat maps, etc.), tabular form, alerts, etc.). In an exemplary implementation, a heat map may be produced as a data visualization tool that shows magnitude of a phenomenon as color in two or three dimensions. The variation in color may be by hue or intensity, for example, and may be distributed across a graphic representation of an environment that was simulated. This gives the user obvious visual cues (e.g., on a computer screen) about how one or more phenomena of interest may be clustered or vary over space within the environment. The discussion that follows pertains to one technique of performing physics computation that involves discretization, & iterative techniques. Below explains how solution variable values in this type of a physics computation methodology exchange at the interface boundary.

Computational Points:
  k: computational point
  [k]: set of all computational points
  [$k_n$]: set of computational points neighboring computational point k
  $k_p$: computational point that lies in the physics region
  [$k_p$]: set of all computational points that lie in the physics region
  $k_{pitf}$: sub-set of $k_p$, pertains to computational points in the immediate vicinity of (e.g., neighboring) the interface on the physics region side
  $k_m$: computational point that lie in the modeled region
  [$k_m$]: set of all computational points that lie in the modeled region
  $k_{mitf}$: sub-set of $k_m$, pertains to computational points in the immediate vicinity of (e.g., neighboring) the interface on the modeled region side
  $k_{itf}$: computational point on the interface boundary
  [$k_{itf}$]: set of all computational points on the interface boundary
Thus, set [k]=set [$k_p$]U set [$k_m$]U set [$k_{itf}$]

There are a variety of ways in which the computer may determine that a particular computational point neighbors another computational point. For example, in some implementations, the software may store an adjacency list, or connectivity list, which may look like: [k1, k2, k45 k66] are connected, [k93, k2, k56, k23] are connected, and so on There are a variety of ways in which the computer may determine that a particular computational point lies in the physics region. For example, in some implementations, the computer may know (e.g., from block 9004 in FIG. 9) the points associated to the physics region. Moreover, in some implementations, the discretizer (e.g., a functional system component that may be implemented by virtue of one or more computer processors executing a piece of software code stored in memory), from its process, may know or identify the volume, geometry it is discretizing.

There are a variety of ways in which the computer may determine, for example, that a particular computational point lies in the modeled region. In some implementations, for example, the computer may know (e.g., from block 9006 in FIG. 9) the set of points associated with the simplified geometry.

There are a variety of ways in which the computer may determine that a particular computational point is on an interface boundary. In some implementations, for example, the computer may be able to determine this by simply referring to the connectivity list.

In a typical implementation, the words/phrases "in the immediate vicinity of" and "neighboring" may refer to computational points that are immediately adjacent to and touching (or sharing a common boundary with) each other.

Results/Solution Variable Values:
  Array R=[r1, r2, . . . ]: Denotes set of solution variable values
  $r_i$: one particular solution variable value, for e.g., temperature or velocity or pressure, etc.
  ri is a field since there exists an ri for every computational point [k].
  Thus, ri in turn is an array. ri=[ri(k1), ri(k2), . . . , ri(k)]
  And so
  R=[
  [r1(k1), r1(k2), . . . , r1(k)],
  [r2(k1), r2(k2), . . . , r2(k)],
  . . . ,
  [ri(k1), ri(k2), . . . , ri(k)],
  . . . ,
  ]

Modeling and Physics Governing Equations:

$M_j$: array of modeling equations $$M_j = [m_j1, m_j2, \ldots, m_ji, \ldots]$$

$m_ji$: one particular modeling equation used to produce result $ri(k_m)$ and $ri(k_{itf})$ in the modeled region and part of the result along interface boundary $P_j$: array of governing equations $$P_j = [p_j1, p_j2, \ldots, p_ji, \ldots]$$

$p_ji$: one particular physics equation used to produce result $ri(k_p)$ and $ri(k_{itf})$ in the physics region and part of the result along interface boundary.

As an example, for a given simulation j and for each solution variable value ri, there exists a governing physics equation $p_ji$. Thus, for each solution variable value R=[r1, r2, . . . ] there is a list of physics governing equations $P_j$=[$p_j1$, $p_j2$, . . . ]. Index j is to characterize the simulation j. Simulation j is characterized by the set of input parameters [$E_j$, $O_j$, $D_j$, $G_j$].

For example, simulation j may involve an e-cooling simulation of a motherboard with environmental parameters $E_j$=[ambient air temp of 40° C., ambient air flow 1 m/s], operational parameters $O_j$=[Power consumption of 100 W, . . . ], external parameters=[n/a] and geometrical parameters=[10 heat sinks with fin height ($H_f$), thickness (t), base length ($L_b$), fin number (N), . . . ], where specific numerical values would be provided to define fin height ($H_f$), thickness (t), base length ($L_b$), fin number (N), etc.

The solution variable values along the interface boundary ($ri(k_{itf})$) or within the modeled region ($ri(k_m)$) may be evaluated using modeled equations $m_ji$ ($k_m$ or $k_{itf}$). The modeled equation is provided by the calibration model. The calibration model takes the simulation j parameters [$E_j$, $O_j$, $D_j$, $G_j$], the computational points $k_m$ and $k_{itf}$ and provides an appropriate array of modeling equations $M_j$ to be evaluated at the computational points ($k_m$, $k_{itf}$) to produce a modeled solution result $ri(k_{itf})$, $ri(k_m)$. Thus, having the results along $k_{itf}$ or $k_{mitf}$ we are now in a position to compute the solution ri along $k_{pitf}$.

$p_ji$ is evaluated for every computational point $k_p$ to produce the solution field $ri(k_p)$. In general, to evaluate the solution at point k, i.e., to obtain ri(k), the physics governing equation $p_ji$, requires information of the solution at the neighboring points [$k_n$]. Thus, for computational points $k_{pitf}$ it can be seen (see FIGS. 13 and 14) that the physics equation $p_ji$ will require information located either at $k_{itf}$ or $k_{mitf}$. That is, $ri(k_{pitf})$ evaluated by $p_ji$ ($k_{pitf}$) requires information at $ri(k_{itf})$ and/or $ri(k_{mitf})$.

Figure 14:
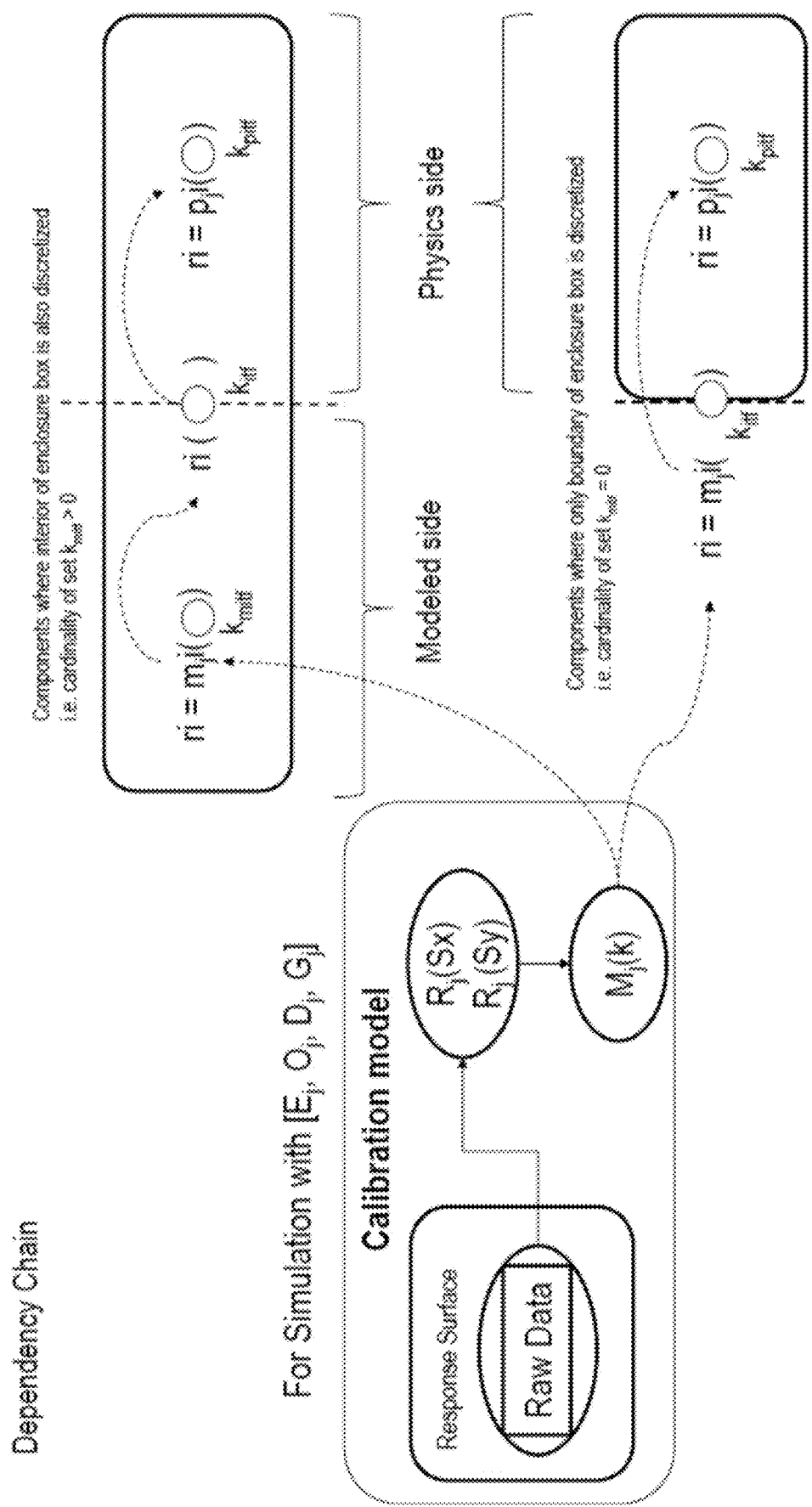
FIG. 14 represents a dependency chain between a calibration model various components in the calibration model.

This dependency chain is represented in FIG. 14. More specifically, FIG. 14 shows that, in relation to a particular calibration model, for computational points $k_{pitf}$, that the physics equation $p_ji$ requires (or uses) information located at $k_{itf}$ for components where only the boundary of the enclosure is discretized (i.e., cardinality of set $k_{mitf}$=0) and that the physics equation $p_ji$ requires (or uses) information located at $k_{mitf}$ for components where the interior of the enclosure is also discretized (i.e., cardinality of set $k_{mitf}$>0). Thus, FIG. 14 shows the case where, for some models, the interior of modeled region does not require (or include) any computational points and the solution from the interface boundary $r_j(k_{itf})$ is all that is required to allow $p_ji(k_{pitf})$ to be evaluated.

In a typical implementation, the inputs required for the system to operate and perform these functionalities would be provided by a user at a computer, via an I/O device coupled to an I/O device interface, such as 5010. The specific interface provided (e.g., for viewing on a screen of the computer) would be configured to enable, facilitate, and/or prompt the user to provide the applicable information. Moreover, one or more memory devices (e.g., 5004, 5006) provide storage for data entered, data calculated based on entered data, CAD drawings, calibrated models, and software executable by a processor (e.g., 5002) to cause the processor to perform the functionalities presented herein and to provide a visual (or other type of) representation of the output of these processes to a user at the computer (e.g., on the computer screen).

There are many ways in which the calibration models utilized herein may be produced. Embodiments described below are directed to a methodology to in-situ formulate a calibrated model for use in a simulation environment for components having no currently existing model due to their physical characteristics. In an exemplary embodiment of the method a simulated experiment setup for a component manually created by a developer is provided as input to determine the parameters of the simulation. A consumer then selects a range of desired inputs and output parameters to measure for each input. The embodiment produces a calibrated model that may be integrated into a physics simulation.

In contrast, while FMUs may be used in systems level simulations, there is no physics computation only models interacting with other models. For example, consider an FMU representation of a power plant. Many components in a power plant require temperature regulation so as to not exceed a certain temperature. Consider the FMU representation of one such component, were based on the FMU model evaluates that its temperature will reach 100 C. This is one of the outputs of the FMU that is fed to the FMU representation of the coolant system in the power plant. The coolant FMU upon receiving this input will evaluate a certain required coolant flow rate and in turn regulate the coolant control valve to achieve this. The FMU models used to represent the operation of these functional blocks are reduced order models, and do not integrate with physics simulation. If say a new component (diverter valve) is needed to be added, however, it disrupts/changes the coolant flow and one needs to know the optimal placement position of this new component, then physics computation is required. FMU models cannot account for such changes. Unlike FMUs, the calibrated models described by the embodiments herein may be integrated with physics simulation. The embodiments provide a method to encapsulate/capture expertise of the developer on a certain class of components by providing a procedural recipe to effectively model the component. This is done by creating virtual experiment setups that can be archived into a library. For example, a developer may design a virtual experiment to extract the effective thermal conductivity of a component (for example, heat sinks). Executing the virtual experiment with the simulated component produces results incorporated into a calibrated model response surface that models the behavior of the modeled component under a range of various operational, environmental, geometrical conditions.

Under the embodiments, the developer generates a knowledge base for new types of components. (e.g., a new type of secondary e-cooling component that is not a heat sink, fan, plate, pipe, etc.). For the developer, the embodiments provide a testing ground (virtual experiment) to observe the response of the component to varying input parameters (defined below) in a controlled manner. The virtual experiment allows a consumer to integrate data provided by a manufacturer of the component (limited experiments run by the manufacturer) along with physics computation. The virtual experiment can link to external parameters such an external FMU type system, or some external functional dependence of some parameters.

The developer may develop a library of such testing grounds for a class of components (e.g., component type: heat sinks) and archive the experimental setup. The archived experimental setups may be used as a template for future VEs with important parameters defined for use, for example which quantities to measure. For traditional or typical variations of the component and their input parameter ranges, the developer can also archive a library of calibrated models as well. For custom or non-standard components, the user proceeds to obtain the calibrated model for a class of components (heat sinks) and adds to the archive of calibrated models. Thus, the user archives the experimental setups created by the developer or consumer for reuse and also archives the calibrated models.

In scenarios when a very specialized component is required and the calibrated model may not have been generated for such an item, a consumer may resort to using the archived virtual experimental setup in-situ and run a subset of input parameter variations and produce a limited range calibrated model to then integrate into the system physics simulations.

An objective of the virtual experiment is to capture the response of a component in isolation to varying input parameters in a controlled manner. While a component may exhibit several kinds of responses, typically the virtual experiment aims to capture the response relevant to the effect of the component on a solution being modeled. For example, while a perforated plate may be heated with increasing temperature, the virtual experiment may only capture the response of the plate with respect to pressure drop.

Figure 15:
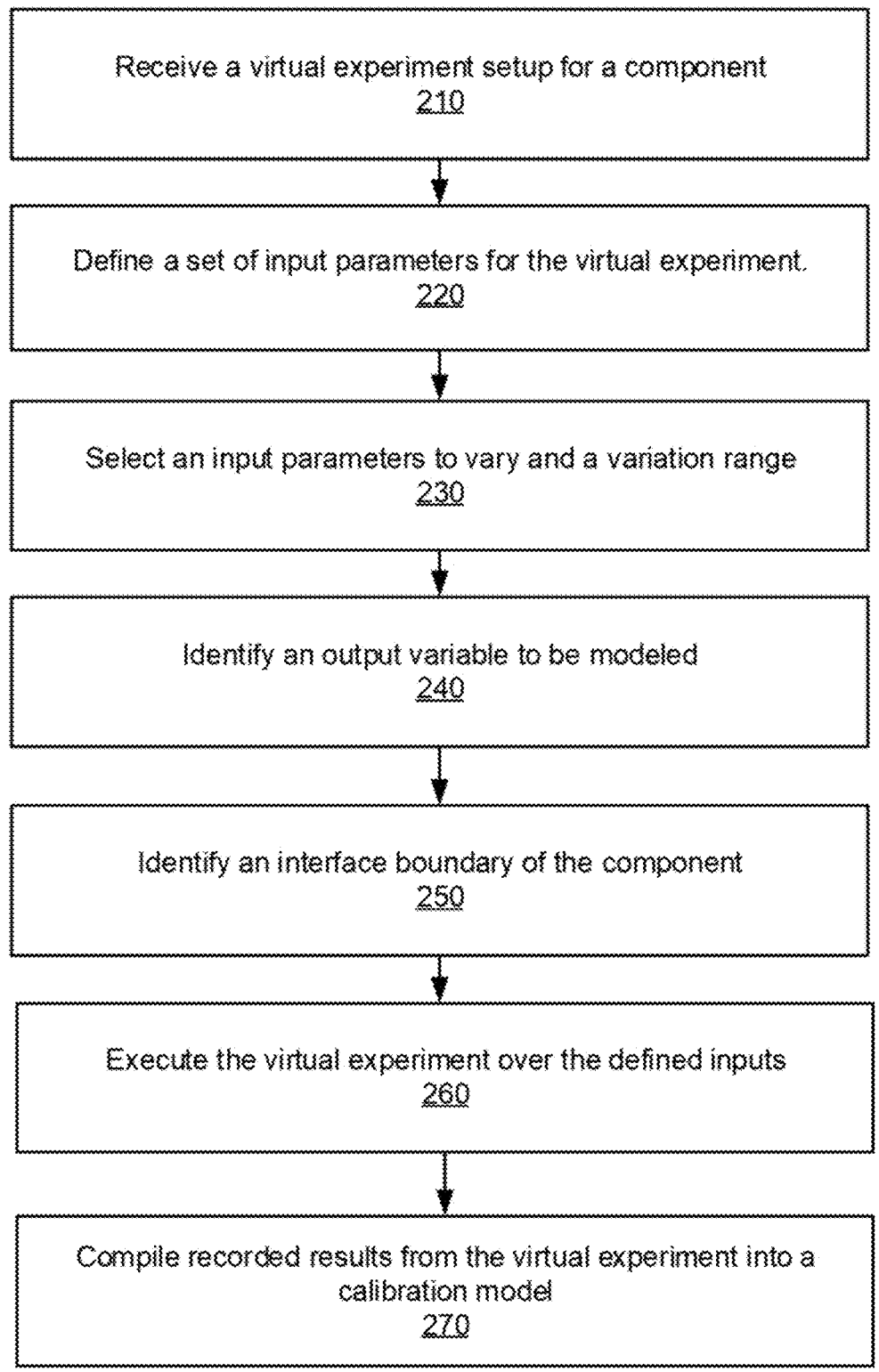
FIG. 15 is a flowchart of an exemplary embodiment for a method for creating an in-situ calibrated model of a component.

FIG. 15 is a flowchart 200 of an exemplary embodiment for a method for creating an in-situ calibrated model of a component. It should be noted that any process descriptions or blocks in flowcharts should be understood as representing modules, segments, portions of code, or steps that include one or more instructions for implementing specific logical functions in the process, and alternative implementations are included within the scope of the present invention in which functions may be executed out of order from that shown or discussed, including substantially concurrently or in reverse order, depending on the functionality involved, as would be understood by those reasonably skilled in the art of the present invention.

A consumer receives a virtual experiment setup for a selected component, as shown by block 210, for example, a virtual experiment set up for the component created by a developer. The consumer defines a set of input parameters for the virtual experiment, as shown by block 220. Examples of input parameters include operational parameters, environmental parameters, and geometric parameters, among other parameters. In the context of a VE for a fan component, exemplary operational parameters may include the rotations per minute (RPM) of the fan and the fan vent opening angle with respect to a fan input. Exemplary geometric parameters may include a fan blade lead angle, a number of fan blades, and a hub radius, among others. Exemplary environmental parameters include ambient air flow, ambient temperature, and pressure, among others. Upon receiving the component and the choice of virtual experiment some aspects of the input and/or its range can be deduced by the system conducting the virtual experiment, for example, geometric parameters and the enclosing interface boundary. The user may then decide to include these parameters by setting their range of variation, or to ignore them.

One or more input parameters may be selected for testing over a range of values, as shown by block 230. For example, the virtual experiment may be set up to be repeated over a range of fan RPM values. One or more output variable value is identified, as shown by block 240. The value of the output variable value is recorded during the VE. For example, for a VE modeling a perforated plate the identified modeled output variable value may be the pressure drop across the plate thickness. In case of a heat sink the modeled output variable value may be an effective thermal conductivity for the heat sink. An interface boundary is identified for the selected component, as shown by block 250. The interface boundary may be the component footprint in a physics simulation or if needed can be user specified. The output variable value is recorded at multiple points on the component interface boundary. Typically, the CAD geometry of the component is automatically detected upon import into the simulation environment.

The virtual experiment is conducted, as shown by block 260. The VE may be repeated to record outputs for inputs parameter identified with variable ranges. The execution of the VE is described in further detail below, with reference to FIG. 16. The results of the VE are compiled into a calibrated model as shown by block 270, for example by converting a discrete representation of the interface boundary (response surface) to a continuous representation by combining raw data with one or more interpolating techniques (such as usage of polynomial, AI, regression, etc.), and provide a modeling function M=[m1, m2, . . . ] as described in further detail below with reference to FIG. 17.

Figure 16:
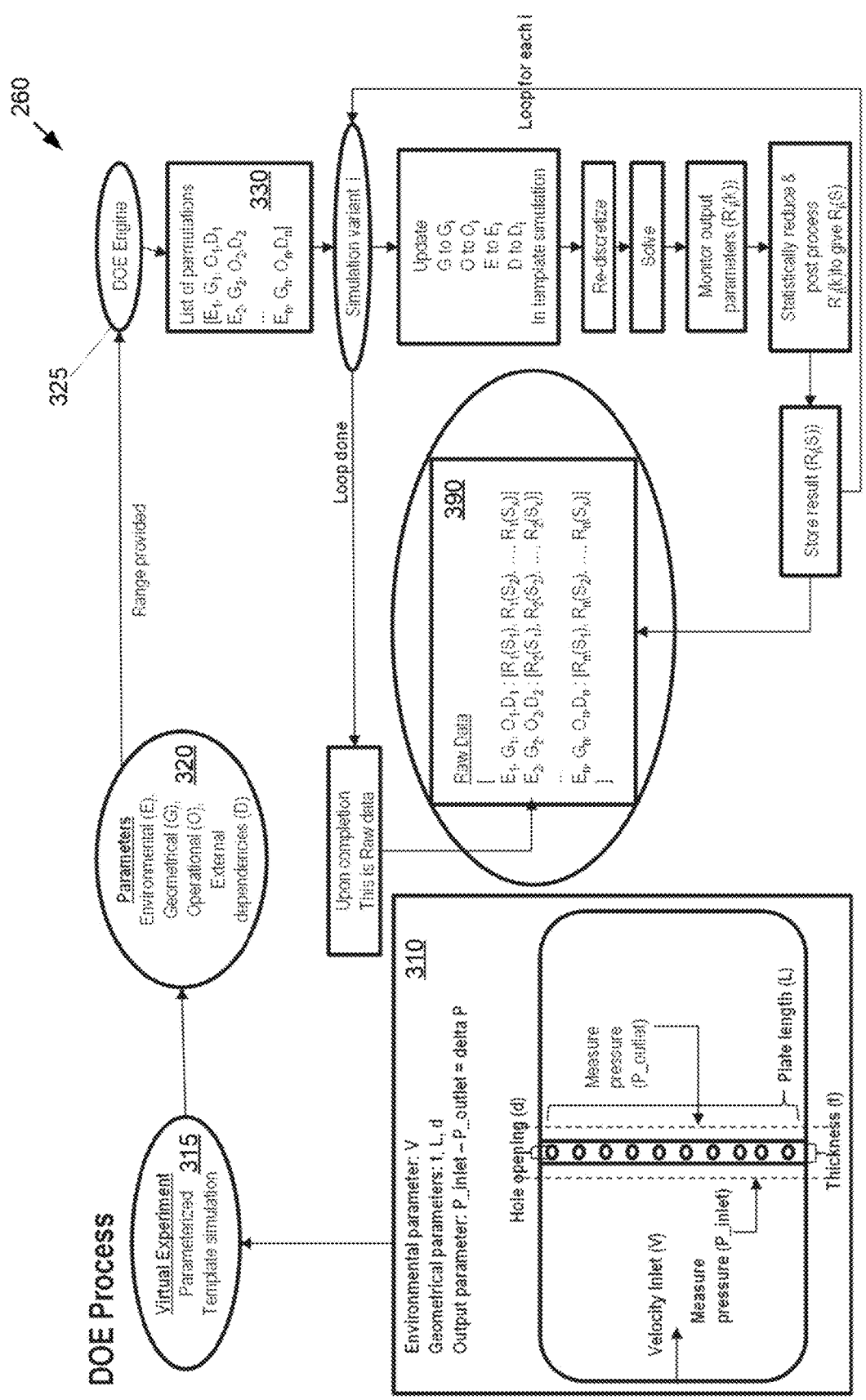
FIG. 16 is a schematic diagram of an example of the FIG. 15 block of executing the virtual experiment.

While, in general, the execution of a VE is known to a person having skill in the art, a specific example of execution via DOE engine that employs an iterative and discretized numerical scheme to solve simulations is provided here, illustrated by FIG. 16 for the specific example of a perforated plate. Alternative embodiments may execute a VE in other ways, for example, using an AI based approach, and/or an iterative, discretized numerical scheme to solve the physics equations, as opposed to using meshless methods or Physics informed neural nets to solve the physics. Using DOE methodology to run a series of virtual experiments, a physics computation simulation is performed for each variant of input parameter. As noted above, a developer provides a template 310 for an experiment for the selected component, here a perforated plate. The template 310 may be tailored to a specific virtual experiment 315 by setting input parameters 320 of the experiment. Here, each simulation variant is indexed by "i" and is characterized by the set of input parameters $[E_i, O_i, G_i, D_i]$, where $E_i, O_i, G_i, D_i$ and $R_i$ respectively indicate the i-th variant of the environmental, operational, geometric, and external dependency parameters. Each of these parameters in turn is a set/array of inputs, for example, the environmental parameters $E_i$ represents an array $E_i=[e1_i, e2_i \ldots ]$, and likewise for parameters $O_i$, $G_i$, and $D_i$.

After the scope of the VE has been defined, a DOE engine (program) 325 launches several physics computational simulations while logging the specific input parameters for each simulation variant. The simulations may be performed in a distributed or serial fashion, or otherwise performed based on a computer resource acquisition algorithm, familiar to persons having skill in the art. Before entering a computational phase, the following occurs for each simulation variant. The DOE program updates the environmental, operational, external, and geometric parameters to reflect the specific variation of the input parameter. The DOE program discretizes the CAD geometry to produce an appropriate distribution of computational points, for example, as described in U.S. patent application Ser. No. 16/874,977, which is incorporated by reference in its entirety herein. For example, distribution of computational points typically follows industry standard pre-loaded heuristics. Here, the interface boundary representing the selected component has been discretized, for example as a segmented surface mesh. The DOE performs the physics computation for each iteration (corresponding to a list of permutations 330). Here, the DOE program monitors and logs the output variable values $R'_i(k)$ at every computational point (k) along the now discrete interface boundary, for example pressure: P(k), and/or temperature T(k).

In some cases, based on the component being modeled, the output of the VE maybe statistically reduced over some topological entity (S) to produce a new output set $R_i(S)$. For example, an average pressure over surface $(S)=P_{avg}(S)$. The specific input parameter and the resulting output parameter are logged into memory as a set in a raw data array 390. Each element in the raw data 390 corresponds to a specific variant of the simulation run and corresponding recorded outputs $[E_i, O_i, G_i, D_i: R_i]$, where $E_i, O_i, G_i, D_i$ and $R_i$ are respectively the i-th variant of the environmental, operational, geometric, external and result/output parameters. The collection of raw data elements is the output of the DOE.

While for the above-described example a DOE is the vehicle for receiving the VE template and producing output parameters, other techniques may be used to traverse the various permutations of input parameters and obtain the resulting output parameters, i.e., obtain the raw data. For example, artificial intelligence (AI) based techniques (physics informed neural nets) compute and or predict the component's response to the various input parameters. For example, while DOE may run physics computation simulation for every single combination of input and record the output variable values obtained, an AI approach may run physics computation for a subset of input parameter combinations and thereafter predict the $R_i$ for the remaining or closely related combinations.

Figure 17:
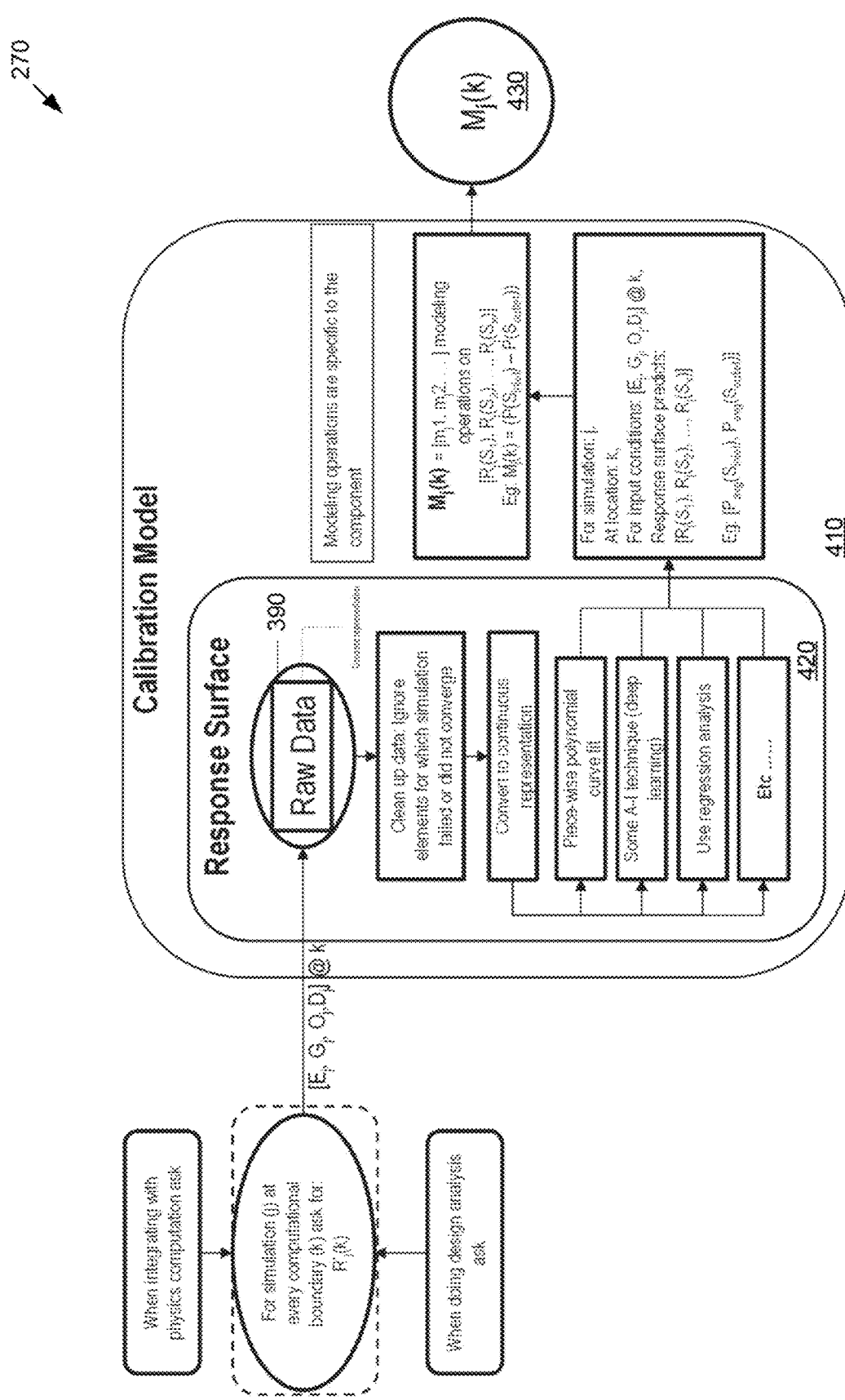
FIG. 17 is a schematic diagram of an example of the FIG. 15 block of compiling recorded results from the virtual experiment into a calibrated model.

FIG. 17 is a schematic diagram showing the conversion of the raw data resultant from the VE into a calibrated model. Typically, for a given component class a certain modeling function or method exists. This is determined by a function of the component and the manner in which it affects the simulation of the VE. Here, modeling function is termed as M. The function M depends on spatial coordinates (x,y,z) or (k) in discretized space, input parameter set [E, G, O, D] and output parameters [R].

Once all the raw data set 390 (FIG. 16) has been produced for the user specified range of input parameters the following steps are performed. In some cases, simulations for certain variant of input parameters may have not converged or produced inaccurate results. This may be determined, for example, from the simulation's convergence plots, as described in U.S. Pat. No. 10,303,825 B2 (incorporated by reference herein in its entirety). Such erroneous results are discarded, and not incorporated into the subsequently described steps. It should be noted that detecting such erroneous simulation runs may be useful to identify any shortcomings of the virtual experimental setup and may thus be a useful feedback to the user (or some automated heuristic algorithm) to refine the simulation.

The filtered raw data set $R_i(S)$ 390 is used to reconstruct a response surface 420 by several techniques such as polynomial curve fitting, regression analysis, A-I techniques, or a combination of these and other pre-existing techniques. These techniques convert the discrete set of data points $(E_i, O_i, G_i, D_i: R_i)$ into a continuous form (E, O, G, D: R). Representing the data in a continuous manner may be advantageous, since for any input $(E_j, O_j, G_j, D_j)$ that does not belong to the input set used to run generate raw data $(E_i, O_i, G_i, D_i)$, one can obtain predicted results $R_j$. Thus, a continuous representation, namely the response surface 420 (FIG. 17), is preferred for modeling. A modeling function M (E, O, G, D, R(k)) is based on the component type and function. The continuous representation is used to produce a modeled response for the component.

Figure 18:
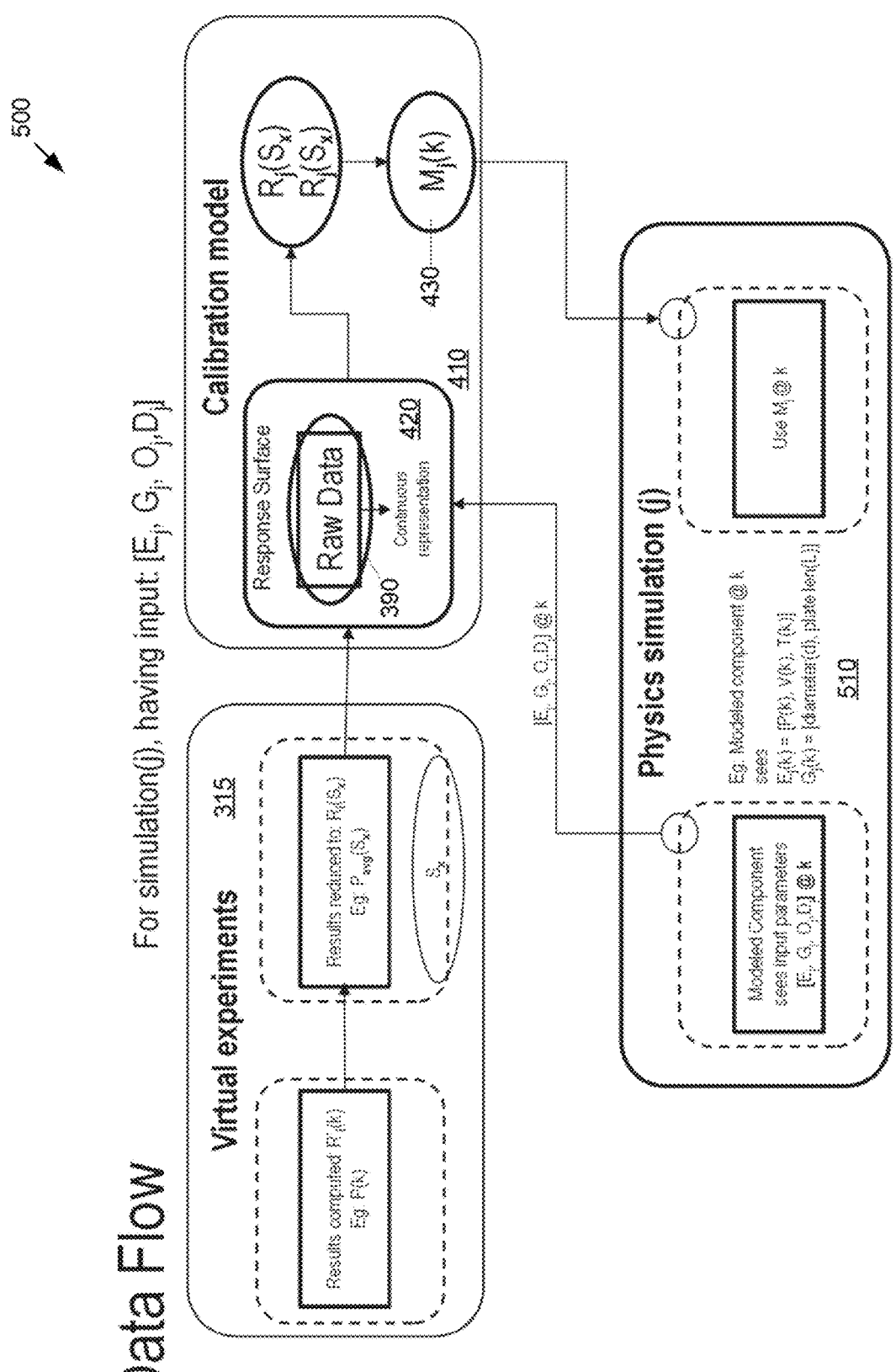
FIG. 18 is a schematic diagram showing the modeling response produced by the calibrated model when a physics computation simulation queries the calibrated model of FIG. 17.

FIG. 18 shows the modeling response 430 produced by the calibrated model 410 when a physics computation simulation 510 queries the calibrated model to produce a response 430. The physics computation simulation 510 provides the input parameter set $[E_j, O_j, G_j, D_j]$, the response surface 420 is used to predict an appropriate output parameter $[R_j]$ that would arise from such an input set and the calibrated model 410 provides the modeled response $M_j$ 430 to the simulation. The exemplary embodiments may produce a workflow that archives a library of experimental setups, and modeling functions designed for a various class of component types (plates, fans, heat sinks, heat pipes etc.), and another library to allow for archival of one or several calibrated models for a component class.

Figure 19:
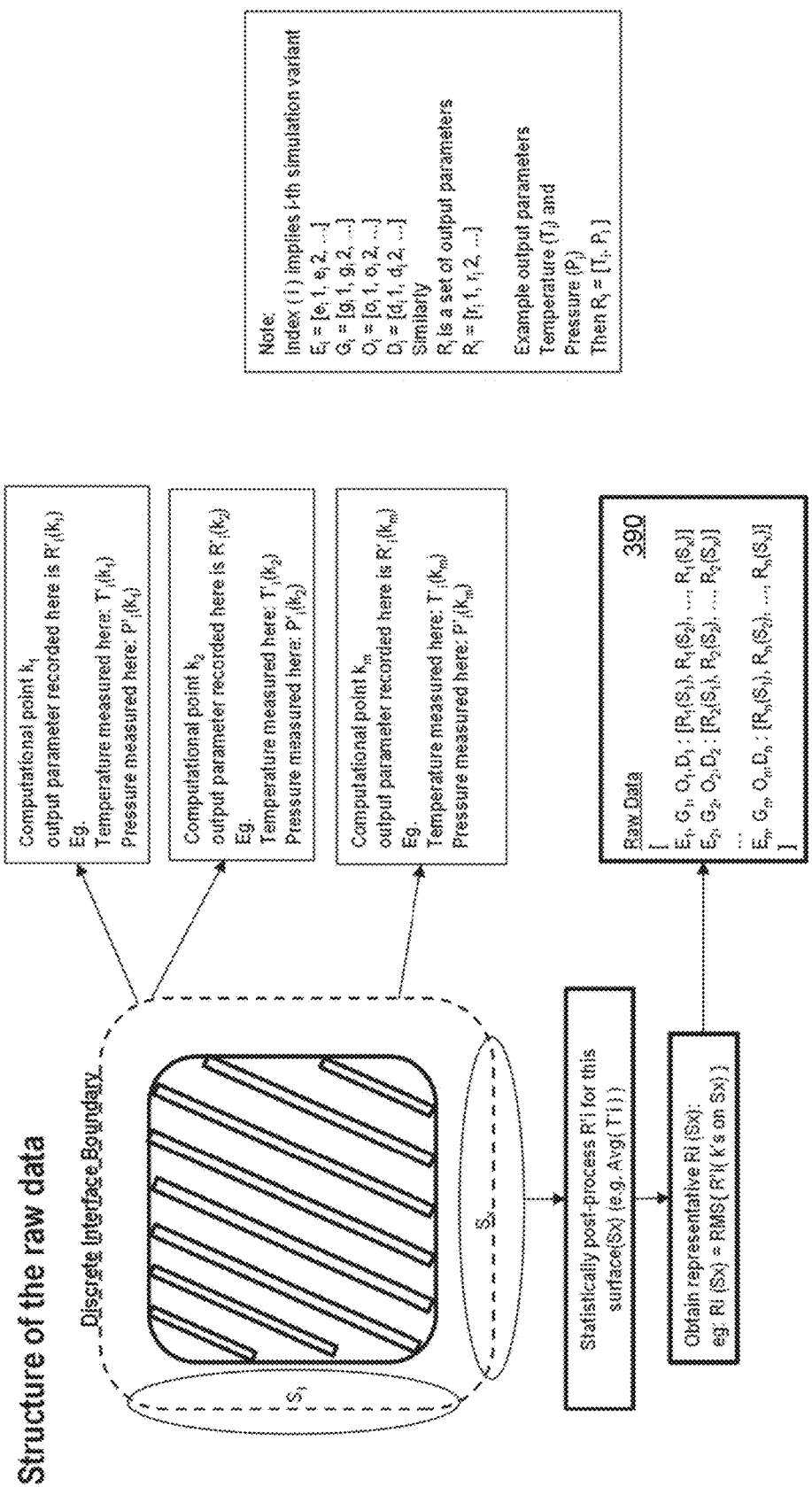
FIG. 19 is a schematic diagram illustrating the structure and construction of the raw data set in a virtual experiment.

FIG. 19 illustrates the structure and construction of the raw data set 390 in a virtual experiment 315. For exemplary purposes, FIG. 19 shows a simulation variant (i) having an input parameter set $[E_i, G_i, O_i, D_i]$. As per the example described previously, each of $E_i, G_i, O_i, D_i$ is in turn an array of parameters for instance: $E_i=[e1_i, e2_i, \ldots, en_i]$. An example of an array of environmental parameters $E_i$ could be ambient pressure $P_i$, ambient temperature $T_i$, ambient air flow velocity $V_i$; thus $E_i=[P_i, T_i, V_i]$. The component boundary ("discrete interface boundary") has been identified. For example, in applications that involve CAD geometry, the footprint/interface boundary may be auto detected, or user specified. When the simulation is discretized, the interface boundary is similarly discretized into a set of k-computational points.

In the virtual experiment 315 (FIG. 16) the physics is computed/predicted (for example, via physics informed neural nets) and output parameters are produced at the computational points along the discretized interface boundary 420. Output parameters: [R'i (k)] are produced, where the single quote "'" indicates data that exists for each computational point.

Like input parameters, the output parameter set is an array. For example, [R'i (k)] may be a set of temperature, pressure, or species fraction at each k-computational grid point at the interface boundary. Thus $[R'_i(k)]=[T'_i(k), P'_i(k), phi'_i(k)]$. The output parameters $[R'_i(k)]$ are statistically reduced along some topological entity S to produce [Ri(S)]. For example, the parameters pressure and/or temperature can be surface averaged along planar surfaces $(S_1, S_2, \ldots S_x)$ to produce $[[R_i(S_1)], [R_i(S_2)], \ldots, [R_i(S_x)]=[[T_i(S_1), P_i(S_1)], [T_i(S_2), P_i(S_2)], \ldots, [T_i(S_x), P_i(S_x)]]$.

For another example, temperature may be statistically reduced using a root mean square operator $(T_i(S_x)=RMS(T'_i(k))$ for all k on $S_x$) while pressure is merely surface averaged: $P_i(S_x)=Average(P'_i(S_x))$. However, in some models no such operation need be performed. The set of input parameters $[E_i, G_i, O_i, D_i]$ and output parameters $[R_i]$ are stored in an array which represents the raw data 390.

Regarding the inputs and outputs of the above-described embodiments, the developer decides the relevant input parameters and their ranges and resolutions. For example, for a fan, the operating range of RPM may vary from 100 to 2000 RPM in steps of 10 rpms. The range for the parameters of the component is typically set according to the expected conditions the component is expected to operate under. The developer chooses how to model the effect of the component, for example, the heat fin may be modeled as an effective conductivity, but alternatively may also be modeled as an effective heat transfer coefficient. Appropriate variables are measured along interface boundary according to the modeling choices. The developer designs the virtual experimental setup so as to obtain a calibrated model that can be integrated into physics computation involving the component under varied environmental, operational & geometric conditions. The input set serves to prepare the virtual experimental setup for a class of components. For example, the above inputs may equate to an experimental setup to model heat fins in general.

In some embodiments, the above-described inputs may be automated to some degree by software provider providing a set of pre-determined virtual experiments for each class of component. In the context of e-cooling workflow: for example, the program may be configured to allow the consumer to select a pre-defined virtual experiment for each class of a component.

For example, the developer may select "calibration experiment for heat sinks" and to choose the virtual setup for a heat sink class of components, and then supply the CAD geometry of the heat fin along with the fidelity in the parameter ranges. The footprint of the heat fin may then be determined. The measured output parameters are already pre-setup for measurement at the footprint boundary, as well as the environmental and operational variables. The geometry variables may be determined based upon the CAD geometry. Here, the consumer would then determine the operational ranges and which geometry parameters are relevant. While the examples described above have been directed e-cooling workflow only, the embodiments are not so limited and virtual experiments may be pre-loaded for other types of workflow.

Given the above-described inputs, the output variable values may be automatically measured at the interface boundary, and output variable values for combinations of the input parameters may be measured and/or predicted. For example, DOE techniques may be employed which involve running a physics computation simulation for every input parameter combination. Alternatively, AI techniques may predict output variable values for a certain combination of input parameters by observing the measured response to a subset of input parameters. Correlations, curve fitting, response surfaces and other techniques capture the above information as the calibrated model. The input set (experimental setup) may be archived for future adaptations.

The resulting calibrated model is a functional representation of the response of the component to varying input parameters. The calibrated model thus obtained integrates into a live physics computation simulation. The calibrated model interacts with the physics computation via the interface boundary. The calibrated model includes a stored representation of the experimental setup (input set). The calibrated model can be stored, for example, as an array of numbers. The array of numbers stores the response surface where each point that constitutes the response surface represents a certain input parameter and the corresponding measured output variable values. Along with storing the discrete representation of the response surface, the calibrated model also contains the recipe to convert the response surface into a continuous representation along with the recipe to produce a modeling function M.

The functional representation of the calibrated model is independent of the details of the virtual experiment, the modeling, or the component. For example, a calibrated model having tabular data that interpolates for intermediate points may be stored as an array of numbers such as:

[
1: V=1, d=0.5, t=0.01, $\Delta$ P1
2: V=1, d=0.8, t=0.01, $\Delta$ P2
3: V=2, d=0.5, t=0.01, $\Delta$ P3
]

Thus, each element in the above array represents a virtual experiment run for a specific set of inputs and the measured output. This collection is the discrete representation of the response surface. For a particular simulation when at a certain interface location, the specific input parameter is between the points stored in the array, for example, V=1.5, d=0.65, t=0.01 then data points closest to this may be interpolated for the $\Delta$ P. Thus, the discrete representation along with the interpolation function provides a continuous representation of the response surface. It should be noted that this example describes just one of many ways to store these correlations.

Alternatively, calibrated models may represent the correlations via polynomial curves. For example, the measured data may be curve fit by a polynomial and the calibrated model stores the polynomial coefficients (a0, a1, a2, . . . )

$$\Delta P = a_0 + a_1 V^2 + a_2 d^2 + a_3 t^2 + a_4 V d + a_5 V t + \quad \text{(Eq. 1)}$$

The developer and consumer may be given several choices how to represent and store the continuous representation of the calibrated model.

Figure 20:
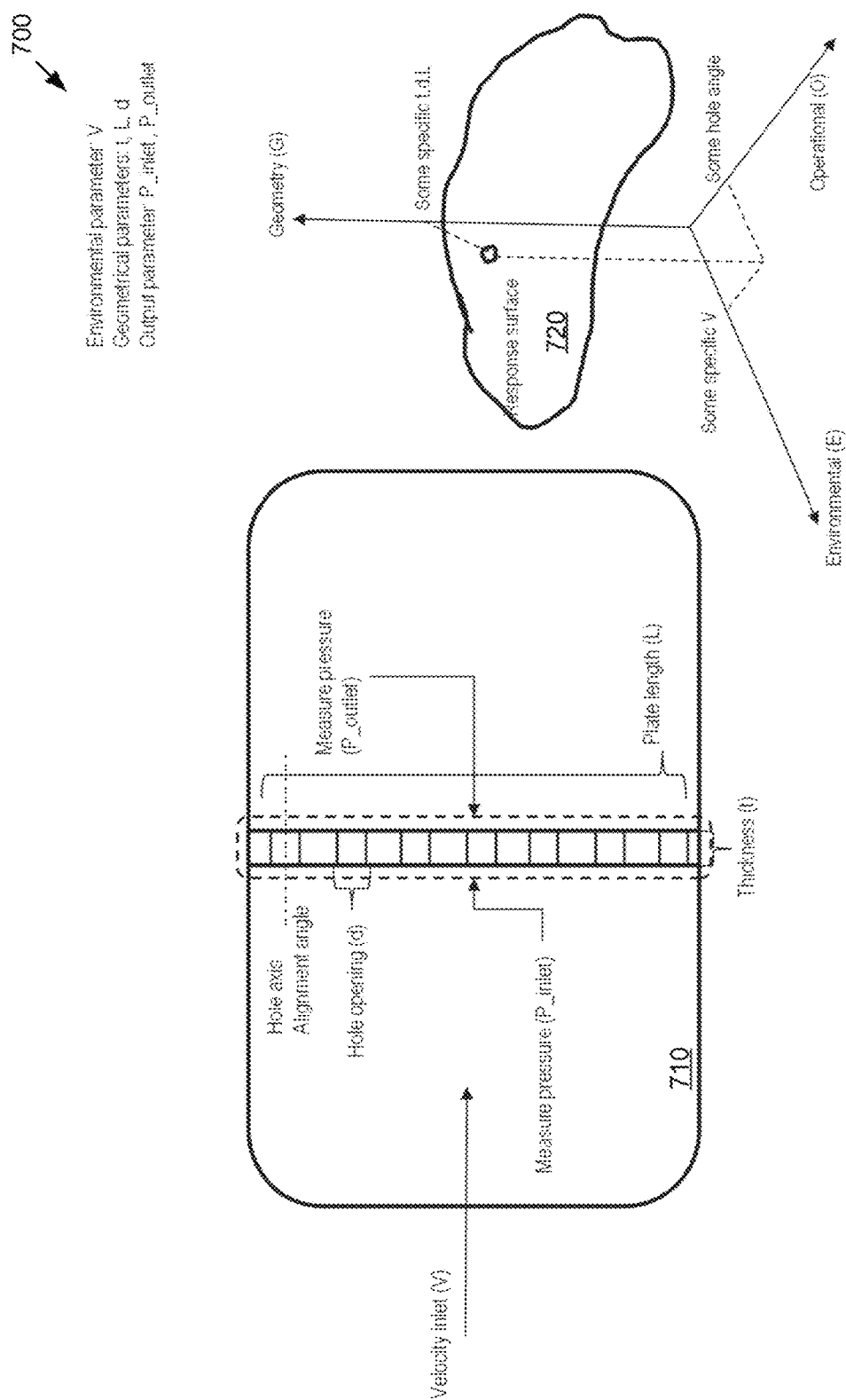
FIG. 20 is a schematic diagram depicting an example of a virtual experiment setup for a perforated plate.

FIG. 20 depicts the following example 700 describing a virtual experiment setup 710 for a perforated plate. Here, a full CAD representation of the perforated plate geometric parameters (d, L, t) is placed in a wind tunnel subjected to environmental parameter (V) and the surface averaged pressure is measured along a plane represented by the dotted lines. Several simulations are run each with a unique combination of (V, t, d, L). For each simulation, the pressure drop across the plate is measured as a function of these input parameters. This produces the correlations between input variable values and measured variable values on a response surface 720.

Figure 21A:
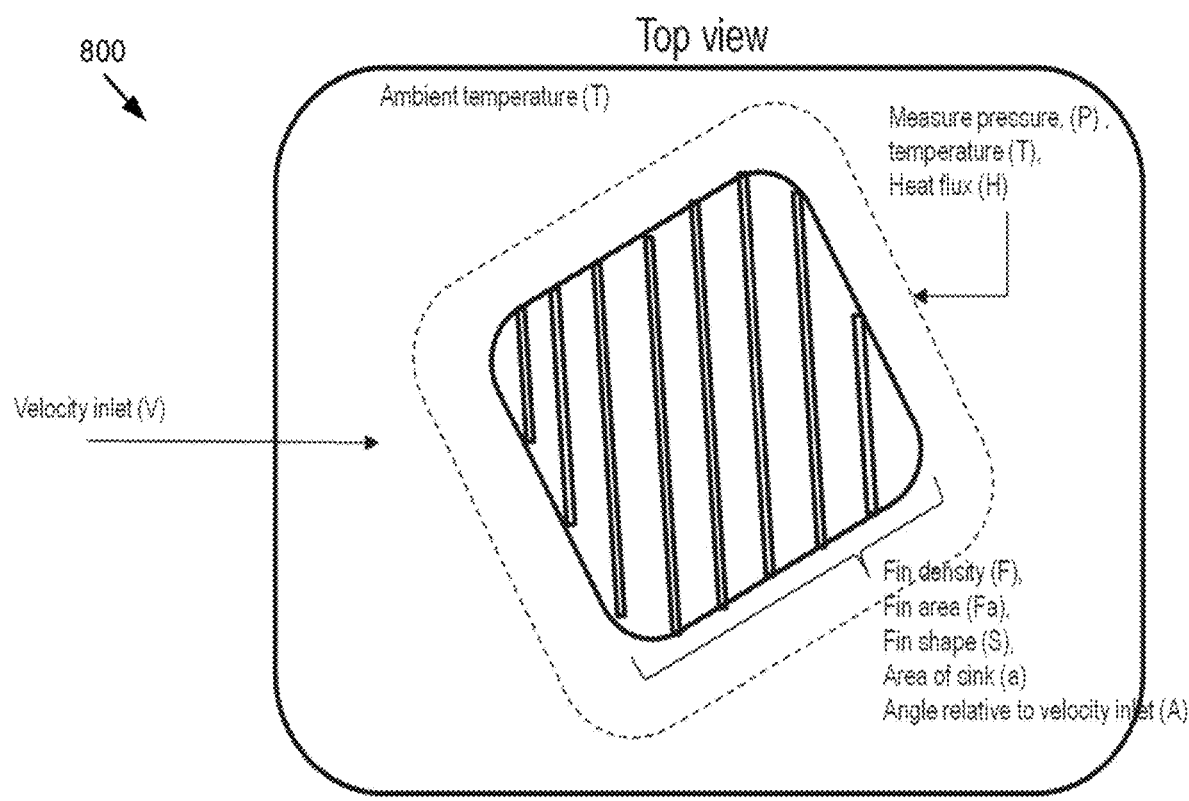
FIG. 21A is a diagram showing an example of a virtual experiment setup for a compact heat sink.
Figure 21B:
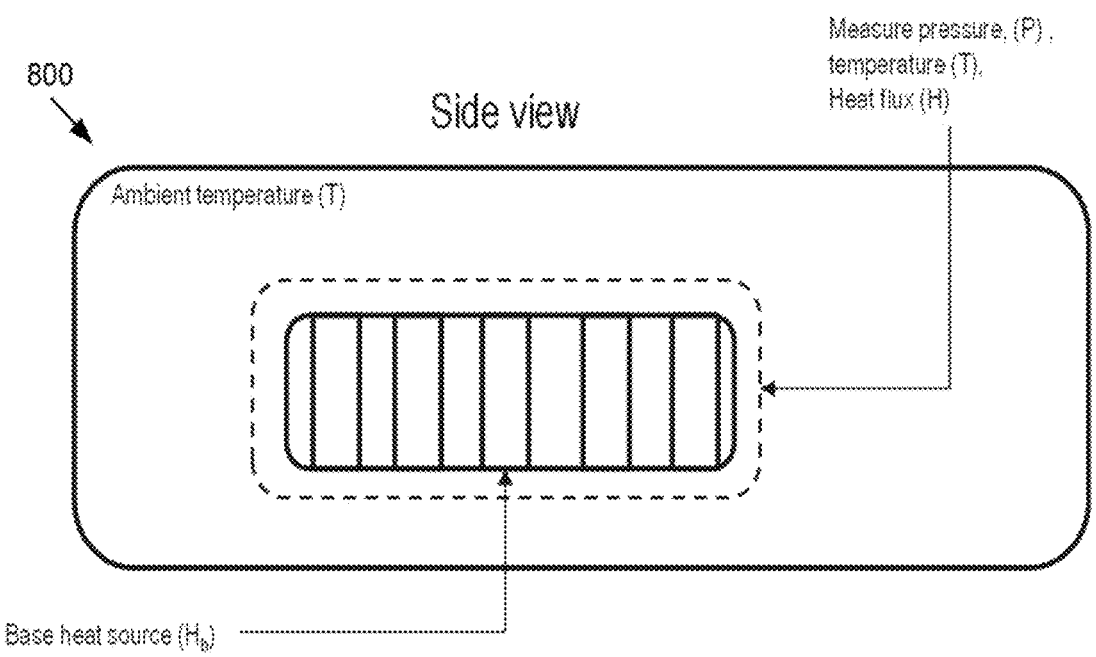
FIG. 21B is a diagram showing a side view of FIG. 21A.

FIGS. 21A-B depict the following example describing a virtual experiment setup for a heat sink 800. Similar to the perforated plate, the virtual experiment here places the full CAD geometric representation of an extruded rectangular fin heat sink in a wind tunnel. The heat sink base heat source, ambient air temperature and the inlet velocity are represented as input parameters.

As with the previous experiment for the perforated plate, here the virtual experiment measures the pressure (P), temperature (T), heat flux (H) along the interface boundary (dotted line). The virtual experiment includes the heat sink geometry and some portion of the surrounding volume to isolate from local effects. The various geometrical parameters (only some of which are illustrated for simplicity) include the fin density, fin area, shape, fin area. The operating parameters are thermal conductivity of the fin material, heat sink heat source input. The environmental parameters are the ambient temperature, the velocity, the relative angle of the velocity with the fin. The measured parameters are heat flux, temperature, pressure at the interface boundary (dotted line).

A number of embodiments of the invention have been described. Nevertheless, it will be understood that various modifications may be made without departing from the spirit and scope of the invention.

For example, the systems and techniques disclosed herein can be implemented to perform simulations to address various different kinds of applications including, for example, aerodynamics (e.g., aerodynamic efficiency; vehicle handling; soiling and water management; panel deformation; driving dynamics), aeroacoustics (e.g., greenhouse wind noise; underbody wind noise; gap/seal noise; mirror, whistle and tonal noise; sunroof and window buffeting; pass-by/community noise; cooling fan noise), thermal management (e.g., cooling airflow; thermal protection; brake cooling; drive cycle simulation; key-off and soak; electronics and battery cooling; ROA/intake ports), climate control (e.g., cabin comfort; HVAC unit & distribution system performance; HVAC system and fan noise; defrost and demist), powertrain (e.g., drivetrain cooling; exhaust systems; cooling jacket; engine block), soiling and water management (a pillar overflow, dirt and dust accumulation, tire spray), etc.

Additionally, it should be understood that the example embodiments described herein may be implemented in many different ways. In some instances, the various methods and machines described herein may each be implemented by a physical, virtual, or hybrid general purpose computer, such as the computer system, or the computer network environment described herein. The computer system may be transformed into the machines that execute the methods described herein, for example, by loading software instructions into either memory or non-volatile storage for execution by the CPU. One of ordinary skill in the art should further understand that the system and its various components may be configured to carry out any embodiments or combination of embodiments of the present invention described herein. Further, the system may implement the various embodiments described herein utilizing any combination of hardware, software, and firmware modules operatively coupled, internally, or externally, to or incorporated into the system. Further, the system may be communicatively coupled to or be embedded within a manufacturing device and be configured so as to control the device to create a physical object as described herein.

Various aspects of the subject matter disclosed herein can be implemented in digital electronic circuitry, or in computer-based software, firmware, or hardware, including the structures disclosed in this specification and/or their structural equivalents, and/or in combinations thereof. In some embodiments, the subject matter disclosed herein can be implemented in one or more computer programs, that is, one or more modules of computer program instructions, encoded on computer storage medium for execution by, or to control the operation of, one or more data processing apparatuses (e.g., processors). Alternatively, or additionally, the program instructions can be encoded on an artificially generated propagated signal, for example, a machine-generated electrical, optical, or electromagnetic signal that is generated to encode information for transmission to suitable receiver apparatus for execution by a data processing apparatus. A computer storage medium can be, or can be included within, a computer-readable storage device, a computer-readable storage substrate, a random or serial access memory array or device, or a combination thereof. The computer storage medium can also be, or be included in, one or more separate physical components or media, for example, multiple CDs, computer disks, and/or other storage devices.

Certain operations described in this specification (e.g., some of those represented in FIG. 9, 15, and otherwise disclosed herein) can be implemented as operations performed by a data processing apparatus (e.g., a processor/specially-programmed processor) on data stored on one or more computer-readable storage devices or received from other sources, such as the computer system and/or network environment in FIGS. 5 and 6. The phrase "data processing apparatus," "processor," or the like encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, for example, code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

Embodiments of the subject matter described in this specification can be implemented as one or more computer programs (i.e., one or more modules of computer program instructions encoded on a tangible non-transitory program carrier for execution by, or to control the operation of, a data processing apparatus). The computer storage medium can be a machine-readable storage device, a machine-readable storage substrate, a random or serial access memory device, or a combination of one or more of them.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations may be described herein as occurring in a particular order or manner, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Other implementations are within the scope of the claims.

What is claimed is:

1. A computer-implemented method of integrating a calibrated model of a first system component with physics computations in a computer-based simulation of a planned or existing real-world environment, the computer-based simulation initially comprising a first physics computation model of the first system component derived from mathematical expressions modeling the behavior of the first system component based on the underlying physical properties of the first system component, and a second physics computation model of a second system component derived from mathematical expressions modeling the behavior of the second system component based on the underlying physical properties of the second system component, the first physics computation model configured to receive parameters defining corresponding structural characteristics of the first system component that, when executed, produces outputs using calculations according to how the first system component responds when subjected to various operating and/or environmental conditions of the system, wherein the calibrated model defines an interface boundary between a modeled region for the first system component disposed inside the interface boundary and a physics region disposed outside the modeled region, the method comprising:

representing the first physics computation model with the calibrated model;

producing modeled solution variable values by the calibrated model at computational points along the interface boundary of the calibrated model;

receiving computed solution variable values produced by the second physics computation model at computational points in the physics region;

exchanging the modeled solution variable values with the computed solution variable values across the interface boundary between the modeled region for the first system component disposed inside the interface boundary and the physics region disposed outside the modeled region;

enabling a user, at a computer-based user interface, to select the selected component from among a plurality of components represented in the computer-based simulation;

receiving, from the computer-based user interfaces, a user selection identifying the selected component;

enabling the user, at the computer-based user interface, to identify a component functionality to associate with the selected component within the computer-based simulation; and replacing a computer-aided design geometry of the selected component with a simplified topological entity to represent the selected component, geometrically, in the computer-based simulation, wherein the user-selected component functionality corresponds to the calibrated model for the selected component and causes the system to assign the calibrated model to represent the selected component in the computer-based simulation.

2. The computer-implemented method of claim 1, wherein the modeled solution variable values along the interface boundary or the modeled solution variable values within the modeled region and immediately adjacent to the interface boundary of the calibrated model are produced from modeled equations within the calibrated model.

3. The computer-implemented method of claim 2, wherein the modeled equations define the modeled solution variable values as functions of one or more user-specified parameter selected from the group consisting of environmental parameters, geometrical parameters, operational parameters, and external dependency parameters.

4. The computer-implemented method of claim 3, wherein each respective physics computation produces computed solution variable values at a particular one of the computational points in the physics region based on a physics governing equation that relies on data associated with a neighboring computational point in the simulated environment.

5. The computer-implemented method of claim 4, wherein the physics computation for each computational point in the immediate vicinity of the interface boundary in the physics region relies on data associated with either one of the modeled solution variable values along the interface boundary or one of the modeled solution variable values within the modeled region and immediately adjacent to the interface boundary of the calibrated model.

6. The computer-implemented method of claim 1, further comprising:

receiving, from one or more computer-based user interfaces, one or more user-specified parameters for the computer-based simulation, wherein each of the one or more user-specified parameter is selected from the group consisting of environmental parameters, geometrical parameters, operational parameters, and external dependency parameters.

7. A computer-based system for integrating a calibrated model of a first system component with physics computations in a computer-based simulation of a planned or existing real-world environment, the computer-based simulation initially comprising a first physics computation model of the first system component derived from mathematical expressions modeling the behavior of the first system component based on the underlying physical properties of the first system component, and a second physics computation model of a second system component derived from mathematical expressions modeling the behavior of the second system component based on the underlying physical properties of the second system component, the first physics computation model configured to receive parameters defining corresponding structural characteristics of the first system component that, when executed, produces outputs using calculations according to how the first system component responds when subjected to various operating and/or environmental conditions of the system, wherein the calibrated model defines an interface boundary between a modeled region for the first system component disposed inside the interface boundary and a physics region disposed outside the modeled region, the computer-based system comprising:

one or more computer processing devices; and computer-based memory operatively coupled to the one or more processing devices, wherein the computer-based memory stores computer-readable instructions that, when executed by the one or more processors, cause the computer-based system to:

represent the first physics computation model with the calibrated model;

produce modeled solution variable values by the calibrated model at computational points along the interface boundary of the calibrated model;

receive computed solution variable values produced by the second physics computation model at computational points in the physics region;

exchange the modeled solution variable values with the computed solution variables across the interface boundary between the modeled region for the first system component disposed inside the interface boundary and the physics region disposed outside the modeled region;

enable a user, at a computer-based user interface, to select the selected component from among a plurality of components represented in the computer-based simulation;

receive, from the computer-based user interfaces, a user selection identifying the selected component;

enable the user, at the computer-based user interface, to identify a component functionality to associate with the selected component within the computer-based simulation; and replace a computer-aided design geometry of the selected component with a simplified topological entity to represent the selected component, geometrically, in the computer-based simulation, wherein the user-selected component functionality corresponds to the calibrated model for the selected component and causes the system to assign the calibrated model to represent the selected component in the computer-based simulation.

8. The computer-based system of claim 7, wherein the modeled solution variable values along the interface boundary or the modeled solution variable values within the modeled region and immediately adjacent to the interface boundary of the calibrated model are produced from modeled equations within the calibrated model.

9. The computer-based system of claim 8, wherein the modeled equations define the modeled solution variable values as functions of one or more user-specified parameter selected from the group consisting of environmental parameters, geometrical parameters, operational parameters, and external dependency parameters.

10. The computer based system of claim 9, wherein each respective physics computation produces computed solution variable values at a particular one of the computational points in the physics region based on a physics governing equation that relies on data associated with a neighboring computational point in the simulated environment.

11. The computer-based system of claim 10, wherein the physics computation for each computational point in the immediate vicinity of the interface boundary in the physics region relies on data associated with either one of the modeled solution variable values along the interface boundary or one of the modeled solution variable values within the modeled region and immediately adjacent to the interface boundary of the calibrated model.

12. The computer-based system of claim 7, further comprising:

receiving, from one or more computer-based user interfaces, one or more user-specified parameters for the computer-based simulation, wherein each of the one or more user-specified parameters is selected from the group consisting of environmental parameters, geometrical parameter, operational parameters, and external dependency parameters.

13. A non-transitory computer readable medium having stored thereon computer-readable instructions that, when executed by a computer-based processor, causes the computer-based processor to:

represent a selected component with a calibrated model thereof, wherein the selected component is represented by a physics computation model and the calibrated model of the selected component defines an interface boundary and a modeled region, which is inside the interface boundary and distinct from a physics region, which is outside the interface boundary;

produce modeled solution variable values based on the calibrated model at computational points along the interface boundary of the calibrated model;

produce computed solution variable values based on physics computations at computational points in the physics region;

exchange the modeled solution variable values with the computed solution variable values across the interface boundary between the modeled region for the first system component disposed inside the interface boundary and the physics region disposed outside the modeled region, enable a user, at a computer-based user interface, to select the selected component from among a plurality of components represented in the computer-based simulation;

receive, from the computer-based user interfaces, a user selection identifying the selected component;

enable the user, at the computer-based user interface, to identify a component functionality to associate with the selected component within the computer-based simulation; and replace a computer-aided design geometry of the selected component with a simplified topological entity to represent the selected component, geometrically, in the computer-based simulation, wherein the physics computation model of the system component is derived from mathematical expressions modeling the behavior of the system component based on the underlying physical properties of the system component, and the physics computation model is configured to receive parameters defining corresponding structural characteristics of the system component that, when executed, produces outputs using calculations according to how the computation model responds when subjected to various operating and/or environmental conditions of the system.

14. The non-transitory computer readable medium of claim 13, wherein the modeled solution variable values along the interface boundary or the modeled solution variable values within the modeled region and immediately adjacent to the interface boundary of the calibrated model are produced from modeled equations within the calibrated model.

15. The non-transitory computer readable medium of claim 14, wherein the modeled equations define the modeled solution variable values as functions of values of one or more user-specified parameters selected from the group consisting of environmental parameters, geometrical parameters, operational parameters, and external dependency parameters.

16. The non-transitory computer readable medium of claim 15, wherein each respective physics computation produces computed solution variables at a particular one of the computational points in the physics region based on a physics governing equation that relies on data associated with a neighboring computational point in the simulated environment.

17. The non-transitory computer readable medium of claim 16, wherein the physics computation for each computational point in the immediate vicinity of the interface boundary in the physics region relies on data associated with either one of the modeled solution variable values along the interface boundary or one of the modeled solution variable values within the modeled region and immediately adjacent to the interface boundary of the calibrated model.

\* \* \* \* \*